US012666361B2

(12) United States Patent
Soldati et al.

(10) Patent No.: US 12,666,361 B2
(45) Date of Patent: Jun. 23, 2026

(54) METHODS TO DETERMINE A CONFIGURATION FOR A USER EQUIPMENT IN MR-DC FOR ENERGY SAVING

(71) Applicant: TELEFONAKTIEBOLAGET LM ERICSSON (PUBL), Stockholm (SE)

(72) Inventors: Pablo Soldati, Solna (SE); Luca Lunardi, Genoa (IT); Reem Karaki, Aachen (DE); Angelo Centonza, Granada (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 314 days.

(21) Appl. No.: 18/288,787

(22) PCT Filed: Apr. 27, 2022

(86) PCT No.: PCT/EP2022/061158

§ 371 (c)(1),
(2) Date: Oct. 27, 2023

(87) PCT Pub. No.: WO2022/229244

PCT Pub. Date: Nov. 3, 2022

(65) Prior Publication Data

US 2025/0008443 A1     Jan. 2, 2025

Related U.S. Application Data

(60) Provisional application No. 63/182,232, filed on Apr. 30, 2021.

(51) Int. Cl.
H04W 52/02 (2009.01)
H04W 16/14 (2009.01)
H04W 76/16 (2018.01)

(52) U.S. Cl.
CPC ....... H04W 52/0261 (2013.01); H04W 16/14 (2013.01); H04W 76/16 (2018.02)

(58) Field of Classification Search
CPC .. H04W 52/0261; H04W 16/14; H04W 76/16
See application file for complete search history.

(56) References Cited

U.S. PATENT DOCUMENTS

2018/0295552 A1     10/2018  Chakraborty et al.
2021/0051592 A1*     2/2021  Wang ............... H04W 52/0206

FOREIGN PATENT DOCUMENTS

WO       2020034608 A1     2/2020

OTHER PUBLICATIONS

International Search Report and Written Opinion issued in International Application No. PCT/EP2022/061158 Aug. 11, 2022 (9 pages).

(Continued)

*Primary Examiner* — Mohammad S Anwar
(74) *Attorney, Agent, or Firm* — ROTHWELL, FIGG, ERNST & MANBECK, P.C.

(57) ABSTRACT

A method for determining a radio configuration for a user equipment (UE) in multi-radio dual connectivity (MR-DC) operation is provided. The method includes obtaining information relating to energy for one or both of (i) the UE in MR-DC operation and (ii) one or more nodes involved in the MR-DC operation of the UE. The method includes determining an optimal radio configuration for the UE in MR-DC operation based at least in part on the information relating to energy. The method includes determining a final radio configuration for the UE in MR-DC operation based on the optimal radio configuration.

21 Claims, 12 Drawing Sheets

1100 obtaining information relating to energy for one or both of (i) the UE in MR-DC operation and (ii) one or more nodes involved in the MR-DC operation of the UE;                                        ⌐s1102 determining an optimal radio configuration for the UE in MR-DC operation based at least in part on the information relating to energy; and                                        ⌐s1104 determining a final radio configuration for the UE (802) in MR-DC operation based on the optimal radio configuration.                                        ⌐s1106

(56)                References Cited

OTHER PUBLICATIONS

3GPP TS 33.401 V16.3.0 (Jul. 2020), 3rd Generation Partnership Project; Technical Specification Group Services and System Aspects; 3GPP System Architecture Evolution (SAE); Security architecture, (Release 16), Jul. 2020, (170 pages).
3GPP TS 38.331 V16.4.1 (Mar. 2021), 3rd Generation Partnership Project; Technical Specification Group Radio Access Network; NR; Radio Resource Control (RRC) protocol specification, (Release 16), Mar. 2021, (949 pages).
3GPP TS 28.552 V17.1.0 (Dec. 2020), 3rd Generation Partnership Project; Technical Specification Group Services and System Aspects; Management and orchestration; 5G performance measurements, (Release 17), Dec. 2020, (207 pages).
3GPP TS 38.473 V16.5.0 (Apr. 2021), 3rd Generation Partnership Project; Technical Specification Group Radio Access Network; NG-RAN; F1 application protocol (F1AP), (Release 16), Apr. 2021, (463 pages).
3GPP TS 36.300 V16.5.0 (Mar. 2021), 3rd Generation Partnership Project; Technical Specification Group Radio Access Network; Evolved Universal Terrestrial Radio Access (E-UTRA), and Evolved Universal Terrestrial Radio Access Network, (E-UTRAN); Overall description; Stage 2, (Release 16), Mar. 2021, (391 pages).
3GPP TS 38.300 V16.5.0 (Mar. 2021), 3rd Generation Partnership Project; Technical Specification Group Radio Access Network; NR; NR and NG-RAN Overall Description; Stage 2, (Release 16), Mar. 2021, (151 pages).
3GPP TS 36.423 V16.5.0 (Apr. 2021), 3rd Generation Partnership Project; Technical Specification Group Radio Access Network; Evolved Universal Terrestrial Radio Access Network, (E-UTRAN); X2 application protocol (X2AP), Apr. 2021, (Release 16), (500 pages).
3GPP TS 37.340 V16.4.0 (Dec. 2020), 3rd Generation Partnership Project; Technical Specification Group Radio Access Network; Evolved Universal Terrestrial Radio Access (E-UTRA) and NR; Multi-connectivity; Stage 2, (Release 16), Dec. 2020, (84 pages).
3GPP TS 38.331 V16.3.1 (Jan. 2021), 3rd Generation Partnership Project; Technical Specification Group Radio Access Network; NR; Radio Resource Control (RRC) protocol specification, (Release 16), Jan. 2021, (932 pages).
3GPP TS 38.401 V15.4.0 (Dec. 2018), 3rd Generation Partnership Project; Technical Specification Group Radio Access Network; NG-RAN; Architecture description, (Release 15), Dec. 2018, (40 pages).

* cited by examiner

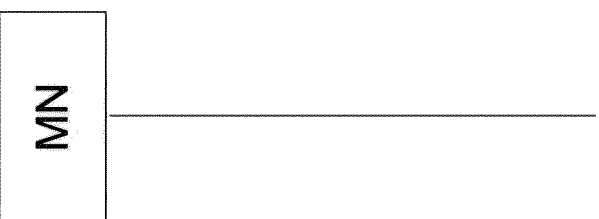
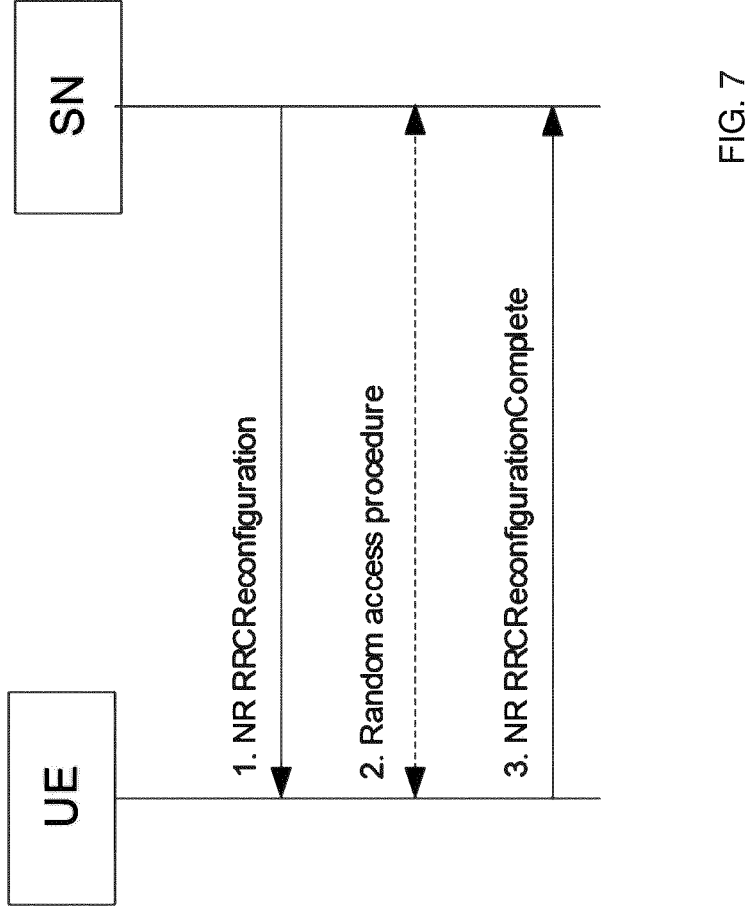
FIG. 7

1100

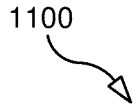

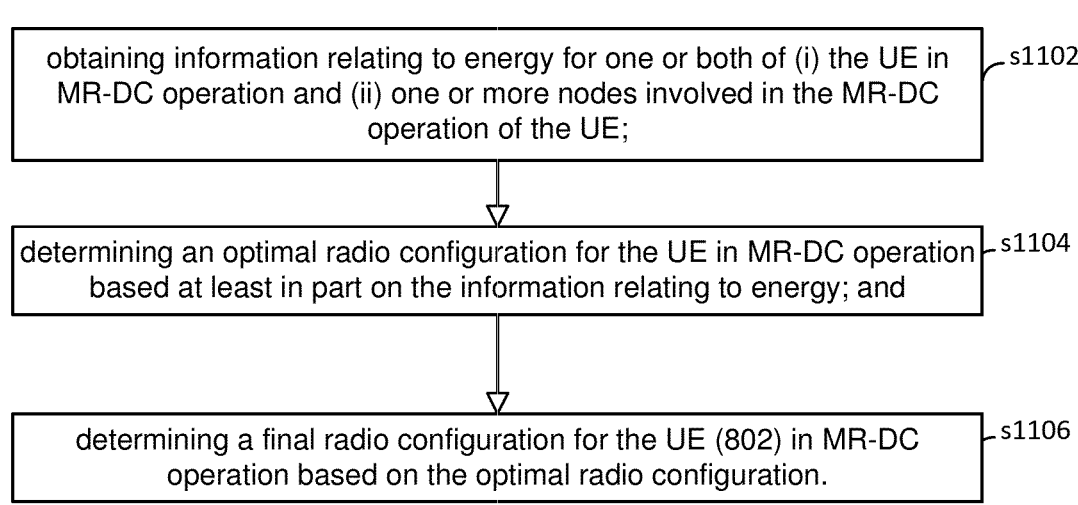

| obtaining information relating to energy for one or both of (i) the UE in MR-DC operation and (ii) one or more nodes involved in the MR-DC operation of the UE; | ⌐s1102 |

| determining an optimal radio configuration for the UE in MR-DC operation based at least in part on the information relating to energy; and | ⌐s1104 |

| determining a final radio configuration for the UE (802) in MR-DC operation based on the optimal radio configuration. | ⌐s1106 |

FIG. 11

METHODS TO DETERMINE A CONFIGURATION FOR A USER EQUIPMENT IN MR-DC FOR ENERGY SAVING

CROSS REFERENCE TO RELATED APPLICATION(S)

This application is a 35 U.S.C. § 371 National Stage of International Patent Application No. PCT/EP2022/061158, filed Apr. 27, 2022, which claims priority to U.S. Provisional Application No. 63/182,232, filed Apr. 30, 2021, which is incorporated herein by this reference.

TECHNICAL FIELD

Disclosed are embodiments related to user equipments (UEs) in MR-DC operation, and in particular, for determining a configuration for a UE in MR-DC for energy saving.

BACKGROUND

1. Third Generation Partnership Project (3GPP) LTE System Architecture (SA)

3GPP has specified the Long Term Evolution (LTE) Evolved Universal Terrestrial Radio Access Network (E-UTRAN) architecture. As illustrated in FIG. 1, LTE E-UTRAN comprises base stations, which are referred to as "evolvedNodeBs (eNBs)," Mobility Management Entities (MMEs), and System Architecture Evolution Gateways (S-GWs). As further shown in FIG. 1, an S1 interface connects the eNBs to the MME/S-GW, and connectivity between eNBs is supported by an X2 interface.

2. 3GPP Next Generation (NG) Radio Access Network (NG-RAN) SA

The current fifth generation (5G) RAN (NG-RAN) (which is also referred to as New Radio (NR)) architecture is illustrated in FIG. 2A and described in 3GPP Technical Specification (TS) 38.401 v15.4.0. The NG-RAN architecture can be further described as follows. The NG-RAN includes of a set of base stations that are called "gNBs," and the gNBs are connected to the 5G Core Network (5GC) through the NG interface. A gNB can be connected to another gNB through the Xn interface. A gNB may consist of a gNB central unit (gnB-CU) and one or more gNB distributed units (gnB-DUs). A gNB-CU and a gNB-DU are connected via the F1 logical interface. For resiliency, a gNB-DU may be connected to multiple gNB-CU by appropriate implementation. The NG interface, the Xn interface, and the F1 interface are logical interfaces. The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signalling transport.

A gNB may also be connected to an eNB via the X2 interface. Another architectural option is that where an eNB connected to an Evolved Packet Core (EPC) network is connected over the X2 interface with a so called nr-gNB. The latter is a gNB not connected directly to a core network (CN) and connected via X2 to an eNB for the sole purpose of performing dual connectivity.

The architecture in FIG. 2A can be expanded by spitting the gNB-CU into two entities. One gNB-CU-UP, which serves the user plane (UP) and hosts the Packet Data Convergence Protocol (PDCP) protocol and one gNB-CU-CP, which serves the control plane (CP) and hosts the PDCP and Radio Resource Control (RRC) protocol. A gNB-DU also hosts lower layer protocols.

3. Multi Radio Dual Connectivity (MR-DC) with EPC

E-UTRAN supports MR-DC via E-UTRA-NR Dual Connectivity (EN-DC), in which a UE is connected to one eNB that acts as a master node (MN) and one en-gNB that acts as a secondary node (SN). The eNB is connected to the EPC via the S1 interface and to the en-gNB via the X2 interface. The en-gNB might also be connected to the EPC via the S1-U interface and other en-gNBs via the X2-U interface.

The EN-DC architecture is illustrated in FIG. 3.

4. Multi Radio Dual Connectivity (MR-DC) with 5GC

E-UTRA-NR Dual Connectivity: NG-RAN supports NG-RAN E-UTRA-NR Dual Connectivity (NGEN-DC), in which a UE is connected to one ng-eNB that acts as a MN and one gNB that acts as a SN.

NR-E-UTRA Dual Connectivity: NG-RAN supports NR-E-UTRA Dual Connectivity (NE-DC), in which a UE is connected to one gNB that acts as a MN and one ng-eNB that acts as a SN.

NR-NR Dual Connectivity: NG-RAN supports NR-NR Dual Connectivity (NR-DC), in which a UE is connected to one gNB that acts as a MN and another gNB that acts as a SN. In addition, NR-DC can also be used when a UE is connected to two gNB-DUs, one serving the master cell group (MCG) and the other serving the secondary cell group (SCG), connected to the same gNB-CU, acting both as a MN and as a SN.

5. Energy Savings in LTE and NR Systems

5.1 RAN Energy Saving

It is advantageous to reduce the operational cost of the RAN through energy savings. This can be achieved by, among other things, turning on/off capacity cells to lower the energy consumption. The decision is typically based on cell load information. The decision can be taken by a RAN node (e.g., base station) or also by an Operation and Maintenance (O&M) function.

A gNB serving a cell that the gNB has deactivated in order to reduce energy consumption can inform a neighboring node of the deactivation by means of an NG-RAN node Configuration Update procedure over the Xn interface, as illustrated in FIG. 2B and described in 3GPP TS 38.423 v16.5.0. Additionally, a gNB node can request another gNB to switch on/off a cell by means of Cell Activation procedure over Xn interface.

Additionally, a RAN node may take energy efficiency actions by reducing load in its served cells. Such reduction in load may translate into reducing the number of served user equipments (UEs) or the number of bearers, and, therefore it may enable the activation of idle periods in the usage of certain functions, such reduction in use consequently generating a saving in energy consumption.

5.2 UE Energy Efficiency

A UE is any device (e.g., smartphone, tablet, computer, sensor, appliance, residential gateway, etc.) that is capable of wirelessly communicating with a RAN node. Power and energy consumption are important operational characteristics for UEs, affecting and in some cases mandating configurations when operating in certain network and traffic scenarios. The network (NW) is expected to allow configurations where these are minimized to avoid overheating and to extend UE battery life, respectively.

UE energy consumption may be different depending on which RRC state the UE is in. For example, for NR, energy consumption may differ depending on the states RRC_CONNECTED, RRC_INACTIVE, and RRC_IDLE. There are several ways in which a UE can reduce energy consumption. These include: (1) increasing the fraction of time that the UE spends in a sleep state, especially a deep sleep where radio frequency (RF) circuitry and/or other circuitry is turned off, and (2) when monitoring signals, operating at minimum necessary receiver configurations, e.g., few antennas, narrow bandwidth (BW), minimum necessary RF quality, etc. The NW can enable and assist this by configuring and signaling to the UE numerous mechanisms. With reference to NR, a gNB can:

Configure signal monitoring (DRX) timelines that allow short monitoring intervals and long sleep intervals between them:
  Connected DRX for data scheduling in connected mode (e.g., period, onDuration length)
  DRX for paging monitoring in idle/inactive modes (e.g., period, PO length, number of POs)
Minimize inactivity timers
  cDRX inactivity timer from last data scheduling to returning to cDRX,
  Data inactivity time from last data scheduling to returning to idle mode
Enable mechanisms that pre-signal whether monitoring is necessary in upcoming intervals
  WUS in connected mode to indicate status of next onDuration
  PEI in idle mode to indicate status of next PO
Guarantee sufficient time for receiver reconfiguration from a minimal to a performance-optimized mode
  Cross-slot scheduling specifying a minimum PDCCH/PDSCH distance
  Indicate a PDCCH skipping duration
  Search space (periodicity) adaptation
Provide guarantees about maximum required receiver performance to handle scheduled data formats
  Indication of maximum MIMO layers that will be scheduled
Avoid unnecessary measurements that diminish UE sleep opportunities
  UE measurement reduction in connected mode for stationary UEs in good conditions
Activate UAI functionality for the UE to indicate specific configuration preferences, etc.
Measurement relaxation, e.g., RRM, RLM, BFD in connected or idle (RRC_idle/inactive) mode.
Reduction of power consumption over Scells, e.g., by dynamic Scell release or activation/deactivation, Scell dormancy, etc.

4. Network Power, Energy, and Environmental Measurements

Network power, energy, and environmental (PEE) measurements have been standardized, e.g. for NR in TS 28.552 v17.1.0, clause 5.1.1.19 (Power, Energy and Environmental (PEE) measurements), e.g. PNF Power Consumption (average, minimum, maximum), PNF Energy consumption, PNF Temperature (average, minimum, maximum).

5. Multi-Connectivity Operations

3GPP TS 37.340 v16.4.0 describes at high level procedures related to multi-connectivity operation, such as:
Secondary Node Addition (for EN-DC and for MR-DC with 5GC).
Secondary Node Modification, MN or SN initiated (for EN-DC and for MR-DC with 5GC)
Secondary Node Release, MN or SN initiated (for EN-DC and for MR-DC with 5GC).
Secondary Node Change, MN or SN initiated (for EN-DC and for MR-DC with 5GC)
PSCell Change
Inter-Master Node handover with/without Secondary Node change (for EN-DC and for MR-DC with 5GC)
A few examples are provided below, and in FIGS. 4-7, showing high level procedures for different multi-connectivity operations.

"Secondary Node Addition", as shown in FIG. 4, involves two RAN nodes, a first RAN node acting as MN and a second RAN node, acting as SN. Refer to 3GPP TS 37.340 clause 10.2 for further details.

"MN initiated SN Change", as shown in FIG. 5, involves three RAN nodes, a first RAN node acting as MN, a second RAN node acting as source SN, and a third RAN node acting as target SN. Refer to 3GPP TS 37.340 clause 10.5 for further details.

"Inter-MN handover with/without MN initiated SN change", as shown in FIG. 6, involves four RAN nodes, a first RAN node acting as source MN, a second RAN node acting as source SN, a third RAN node acting as target SN, and a fourth RAN node acting as target MN. Refer to 3GPP TS 37.340 clause 10.7 for further details.

"SN modification-SN initiated without MN involvement", as shown in FIG. 7, involves one RAN node, a second RAN node, acting as SN (the UE is configured in dual connectivity also toward a first RAN node, acting as MN, but the first RAN node is not involved in the procedure). Refer to 3GPP TS 37.340 clause 10.3.1 for further details.

6. Band Combination and Feature Sets

UE capabilities for supporting different bands, band combinations, carrier aggregation, and feature are described in 3GPP technical specifications. For example, for NR, refer to 3GPP TS 38.331 v16.4.1, clause 6.3.3 for:
BandCombinationList
CA-ParametersNR
CA-ParametersNRDC
FeatureSetCombination

SUMMARY

Certain challenges presently exist. For example, currently, the interaction between network nodes serving one or more UEs in MR-DC operation does not consider energy and/or power related aspects.

When a UE is configured (or reconfigured) due to MR-DC related procedures and operations, the selected combination of cells and the configuration towards the UE used to set up such type of multi connectivity, e.g. in terms of PCell, PSCell and SCells, and the associated configuration parameters, do not currently consider energy related aspects associated to the UE. Similarly, the configuration selected for multi-connectivity towards a UE does not take into account energy related aspects related to the network, e.g. the energy efficiency of the network serving the UE. Similarly, the configuration selected for multi-connectivity towards a UE does not take into account UE preferences in terms of energy savings when operating in MR-DC.

As an example, at a given point in time, there might be two configurations comprising a different combination of component carriers. Both are supported by the UE and can provide to the UE similar levels of performance, e.g. the same or similar throughput (or at least the same level of a sufficiently good throughput). One of the two configuration may comprise only carriers of Frequency Range 1 (FR1), and the second configuration may comprise a mix of carrier frequencies, some of Frequency Range 1 (FR1) and some of Frequency Range 2 (FR2). If the energy consumption of the UE is higher when carriers of FR2 are used, compared to when operating only with carriers of FR1, selecting the first configuration can have a positive impact in terms of battery saving for the UE, without sacrificing end-user performances.

As another example, the UE configuration may be achieved by configuring a MCG on an FR1 frequency and a SCG on an FR2 frequency. If the SCG cell has a bigger coverage than the MCG cell it might be more energy efficient (if at all possible) from a network point of view to enable the MCG on FR2 and the SCG on FR1. This is because operating a wide coverage cell on FR2 is more energy expensive than providing the same coverage on FR1.

Therefore, solutions are needed to address this and other problems with current technology.

Embodiments disclosed herein enable network nodes to determine and apply to a UE participating in MR-DC operations, a radio configuration that considers energy related aspects of the UE and/or of the network nodes and performance related aspects for the UE (e.g. fulfillment of QoS requirements), utilizing measured data and/or predictions.

Embodiments also enable user devices to report UE related energy state assistance information (UE-ESAI) or Energy Efficiency (EE) feedback associated to a MR-DC configuration to the network nodes involved in the MR-DC procedures or operations. UE-ESAI can also be called UE Energy Efficiency Assistance information (UE-EEAI)—that is UE-ESAI and UE-EEAI are synonymous. Additionally, embodiments allow network nodes to exchange energy efficiency metrics between each other so to achieve an understanding of whether new DC configurations can achieve an overall improvement in network energy efficiency. The feedback reported by the user device and/or by the network in relation to a MR-DC configuration can be used to enable data-driven optimization of the algorithms handling the MR-DC configuration for the user devices.

Artificial Intelligence (AI) and Machine Learning (ML) techniques can be applied, where historical data concerning UEs and networks involved in MR-DC can be used as input to infer the optimal radio configuration to apply to a specific UE when the UE is reconfigured from single connectivity to dual connectivity, or when the UE is reconfigured from dual connectivity to single connectivity, or when at least one network related aspect concerning dual connectivity is updated.

The RAN nodes involved in MR-DC procedures and operations for the UE for which the radio configuration is determined, can negotiate/coordinate the final radio configuration to apply to the UE.

One of the advantages of the proposed embodiments is to enable energy saving at the UE level and at the network level when operating in MR-DC, while service requirements can be maintained. Another advantage is to enable data-driven optimization of the algorithms handling the MR-DC configuration for the user devices by means the feedback reported by the user device and by the network in relation to a MR-DC configuration. This enables one or more nodes to optimize, for each user device, the balance between energy efficiency and performance when operating in MR-DC, e.g. by using AI/ML techniques that can leverage the feedback collected by multiple user devices (possibly across multiple network nodes and/or cells), which can improve upon traditional optimization techniques.

According to a first aspect, a method performed by one or more network nodes for determining a radio configuration for a user equipment (UE) in multi-radio dual connectivity (MR-DC) operation is provided. The method includes obtaining information relating to energy for one or both of (i) the UE in MR-DC operation and (ii) one or more nodes involved in the MR-DC operation of the UE. The method further includes determining an optimal radio configuration for the UE in MR-DC operation based at least in part on the information relating to energy. The method further includes determining a final radio configuration for the UE in MR-DC operation based on the optimal radio configuration.

Corresponding embodiments of network nodes, configured for performing said method, are also disclosed herein.

BRIEF DESCRIPTION OF THE DRAWINGS

The accompanying drawings, which are incorporated herein and form part of the specification, illustrate various embodiments.

FIG. 7 illustrates a "SN modification-SN initiated without MN involvement" procedure.

FIG. 11 is a flowchart illustrating a process according to some embodiments.

DETAILED DESCRIPTION

Figure 1:
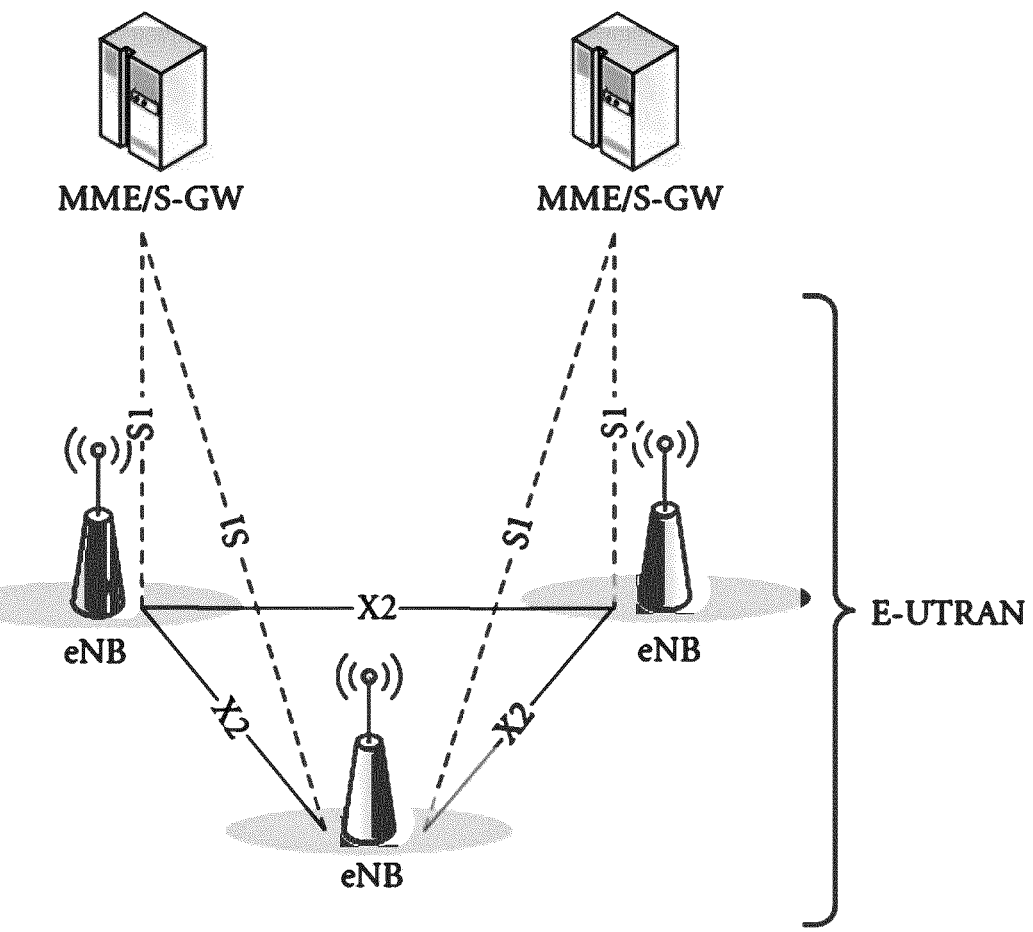
FIG. 1 illustrates a LTE E-UTRAN system.
Figure 2A:
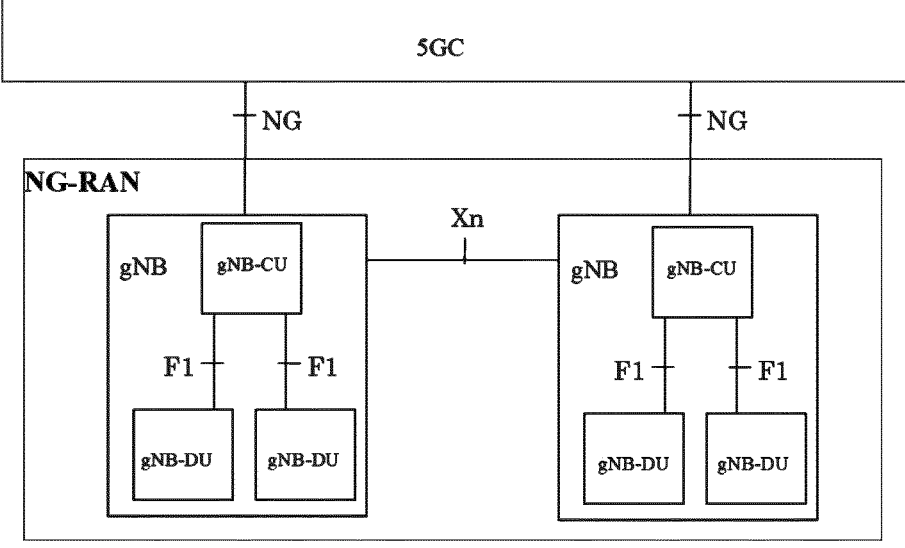
FIG. 2A illustrates an NG-RAN architecture.
Figure 2B:
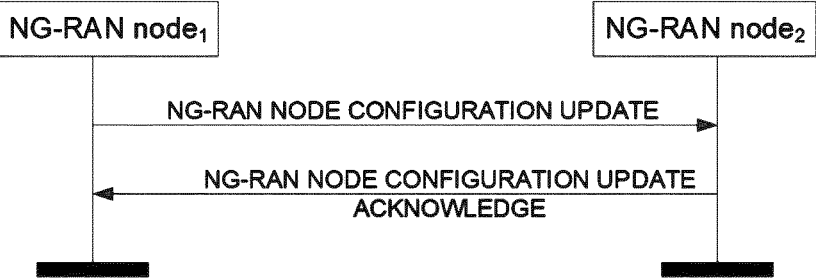
FIG. 2B illustrates an NG-RAN node Configuration Update procedure.
Figure 3:
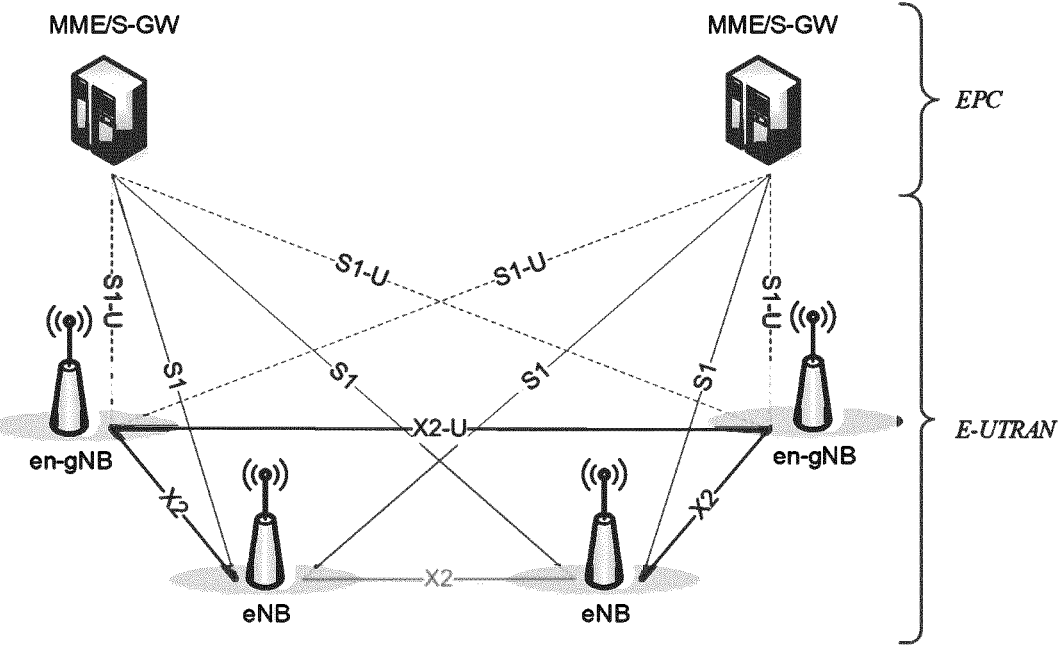
FIG. 3 illustrates an EN-DC architecture.
Figure 4:
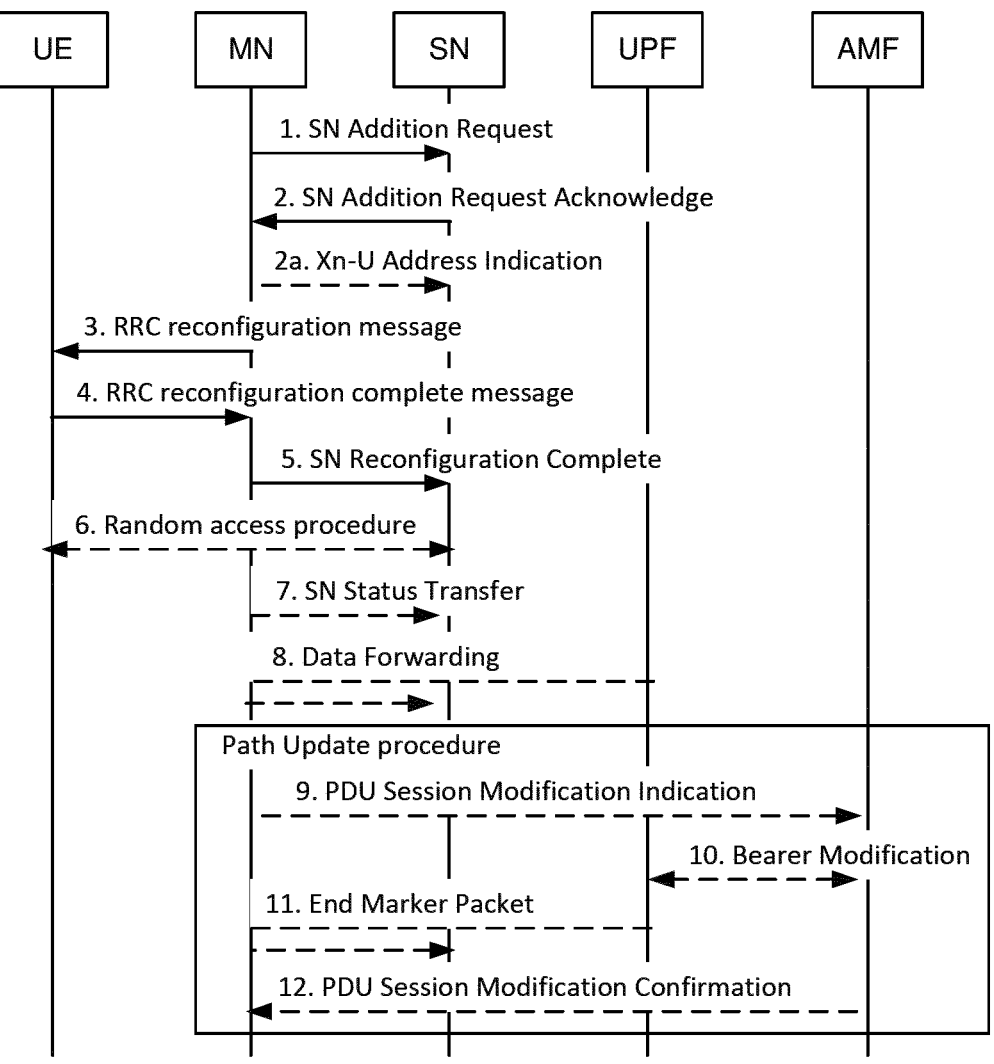
FIG. 4 illustrates a "Secondary Node Addition" procedure.
Figure 5:
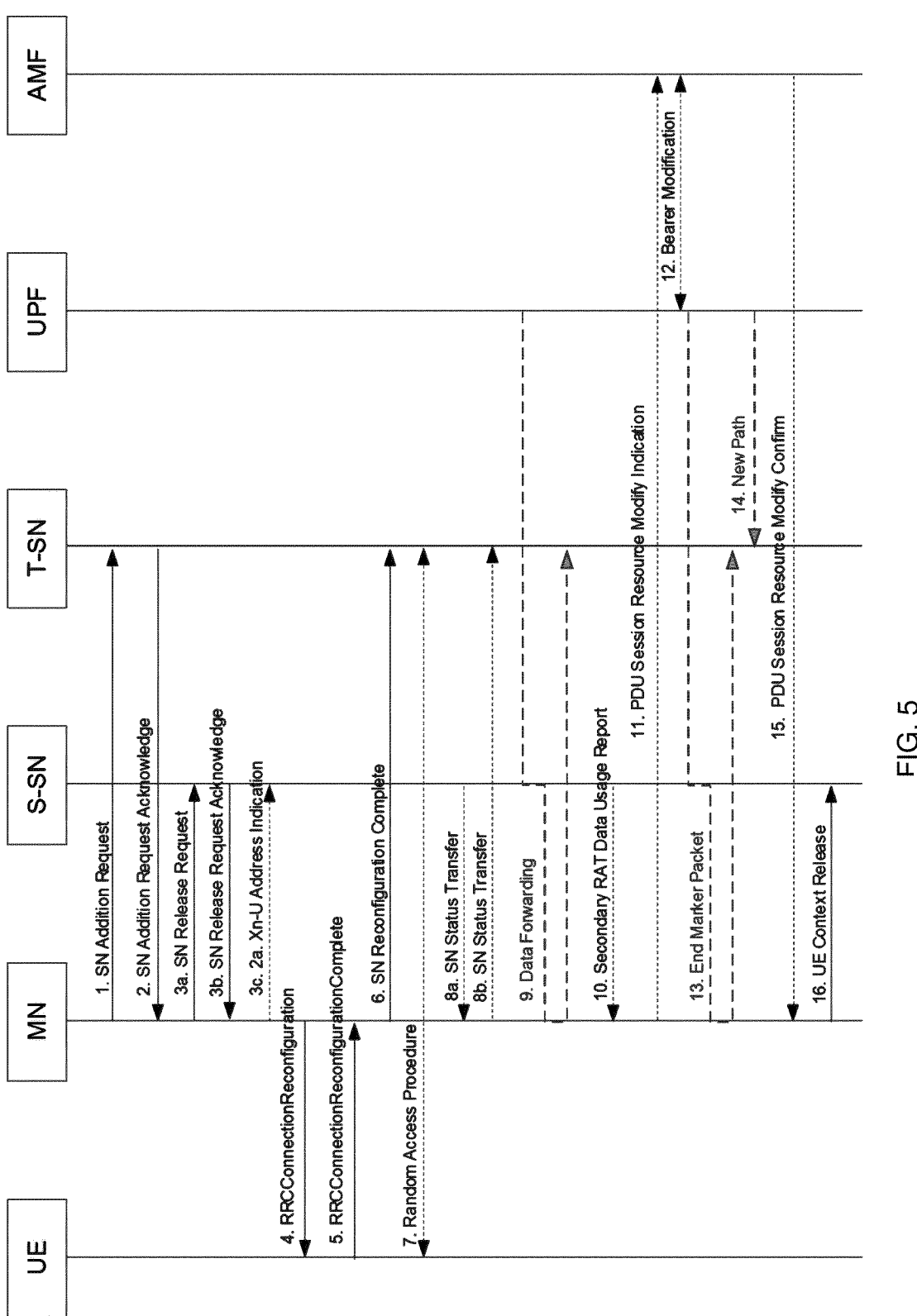
FIG. 5 illustrates a "MN initiated SN Change" procedure.
Figure 6:
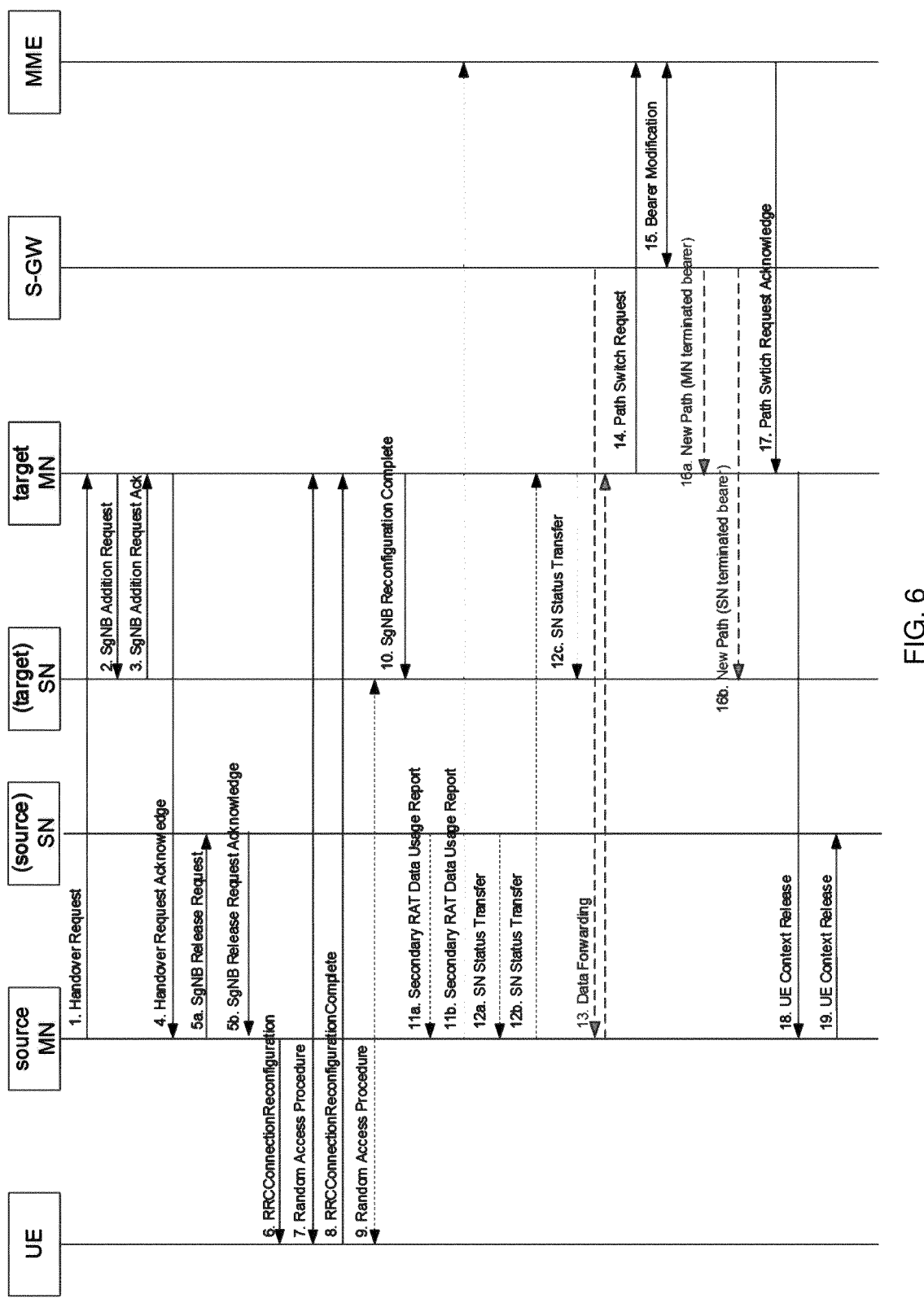
FIG. 6 illustrates a "Inter-MN handover with/without MN initiated SN change" procedure.

Embodiments disclosed herein provide methods that enable a network node to find a radio configuration for a UE involved in MR-DC operations that can provide an optimal balance between UE and/or network energy related aspects and UE performance (e.g. fulfilment of QoS requirements). This application uses the term "energy related aspects" (and correspondingly the term "energy") to refer to any or all of energy, power, energy savings (e.g., energy efficiency), power savings (e.g., power efficiency), energy consumption, power consumption, and a variation of any of these. Energy efficiency may reduce energy consumption by using less energy (i.e., save energy) to attain the same amount of useful output. Accordingly, increasing a device's energy efficiency results in reduced energy consumption (i.e., an "energy savings"). Energy savings therefore encompasses energy efficiency, and likewise for power savings and power efficiency.

In embodiments, a network node can be a RAN node, a CN node, an OAM node, an SMO node. Methods of the disclosed embodiments may be executed by any of these network nodes, and the methods may be executed at different times with respect to MR-DC operations. For example, the methods can be executed prior to, during, and/or after (i) reconfiguration of a UE from single connectivity to dual connectivity, (ii) reconfiguration of a UE from dual connectivity to single connectivity, and (iii) reconfiguration of a UE from a first form of dual connectivity to a second form of dual connectivity.

For example, methods of disclosed embodiments may be executed prior to, during, and/or after reconfiguration of a UE from single connectivity to dual connectivity to find an optimal radio configuration for the UE when being connected to/served by two cell groups (an MCG and an SCG). An example scenario for this case is provided by the procedure "Secondary Node Addition". Methods of disclosed embodiments may be executed prior to, during, and/or after reconfiguration of a UE from dual connectivity to single connectivity to find an optimal radio configuration for the UE and/or for the network once dual connectivity is not used. An example scenario for this case is provided by the procedure "Secondary Node Release". Methods of disclosed embodiments may also be executed prior to, during, and/or after reconfiguration of a UE from a first form of dual connectivity to a second form of dual connectivity to find an optimal radio configuration for the UE and/or for the network as the configuration pertaining to dual connectivity is updated. Example scenarios for this case are provided by the procedures "Secondary Node Change" and "Inter-MN handover with/without MN initiated SN change".

The optimal configuration may be found by means of AI/ML techniques, in which case the aspects of model training, validation, and inference can be done in different network nodes or in the same network node, where a network node can be one of the RAN nodes involved in dual connectivity, or another RAN node, such as an OAM node, a CN node, an SMO, or another entity.

AI/ML techniques can be used to train and validate an AI/ML model or algorithm, based on the input data specified below, that a network node can use to infer an UE configuration providing optimal balance between UE performance (e.g. fulfillment of QoS parameters, such as throughput, delay, jitter) and energy related aspects for the UE and/or for the network when the UE is using two cell groups in dual-connectivity.

The network nodes where the training and/or validation and/or inference phases are done can be at least one of the RAN nodes involved in MR-DC operation, another RAN node, an OAM node, a CN node, an SMO, or another entity. Different network nodes can be used for training, validation, inference, and for executing the inferred results/decisions.

The inferred results/decisions of the model can be provided to at least one of the RAN nodes involved in MR-DC operation.

Non limiting examples of AI/ML algorithms that could be trained and executed by a network node to determine a radio configuration for a UE involved in MR-DC operations that can provide an optimal balance between UE and/or network energy related aspects and UE performance (e.g. fulfilment of QoS requirements) may include supervised learning algorithms, deep learning algorithms, reinforcement learning type of algorithms (such as DQN, A2C, A3C, etc.), contextual multi-armed bandit algorithms, autoregression algorithms, etc., or combinations thereof. Such algorithms may exploit functional approximation models, such as neural networks (e.g. feedforward neural networks, deep neural networks, recurrent neural networks, convolutional neural networks, etc.), which can be trained to approximate a value function providing an indication of how good a certain configuration is for a UE. Examples of reinforcement learning algorithms may include deep reinforcement learning (such as deep Q-network (DQN), proximal policy optimization (PPO), double Q-learning), actor-critic algorithms (such as Advantage actor-critic algorithms, e.g. A2C or A3C, actor-critic with experience replay, etc), policy gradient algorithms, off-policy learning algorithms, etc.

In one example, an AI/ML algorithm could be trained to choose among a set of possible radio configurations that can be applied to a UE involved in MR-DC operations to provide an optimal balance between UE and/or network energy related aspects and UE performance (e.g. fulfilment of QoS requirements). Examples of such a radio configuration may comprise one or more parts of an RRC Reconfiguration as defined by the 3GPP NG-RAN or 3GPP LTE systems, such as masterCellGroup, radioBearerConfig, secondaryCellGroup, mrdc-SecondaryCellgroupConfig, etc. In this case, the algorithm could be trained with data samples comprising, for instance, a radio configuration selected for the user device when involved in a MR-DC operation, one or more information elements describing the state of the UE prior to being configured with the selected radio configuration, one or more information elements describing the state of the network prior to configuring the UE with the selected radio configuration, and an indication of the network and/or user performance resulting from configuring the UE with the selected configuration.

When executing an AI/ML algorithm for choosing a radio configurations for a UE involved in MR-DC operations to provide an optimal balance between UE and/or network energy related aspects and UE performance (e.g. fulfilment of QoS requirements), the network node may use one or more one or more information elements describing the current state of the UE, and one or more information elements describing the state of the network. In one example, based on this information, the AI/ML algorithm could determine the optimal radio configuration of the UE among a set of possible radio configurations that can be applied to the UE involved in MR-DC operations. In another example, the algorithm could provide a measure/score for each of the available radio configurations that can be applied to UE involved in MR-DC operations, where the measure/score indicates how good is each radio configuration. In yet another example, the AI/ML algorithm could return a probability distribution function associated to a set of possible radio configurations that can be applied to the UE involved in MR-DC operations, where the probability distribution function characterizes the probability of each of the available configurations being the best one for the UE.

A radio configuration that considers energy related aspects for the UE and/or for the network can be inferred by a network node and can be applied to a UE as is, or after a negotiation phase between network nodes. Multiple network nodes may each have determined an optimal configuration, for example, and negotiation among the network nodes may result in a modified configuration. The modified configuration may be a selected one of the optimal configurations from the multiple network nodes, or it may be a new configuration based on parts of one or more of the optimal configurations from the multiple network nodes. For example, the negotiation phase may consider additional constraints at the RAN nodes comprised in MR-DC operation. The inferred configuration, after the optional negotiation phase, is compared with the configuration presently used by the UE, and if different, one of the RAN nodes involved in MR-DC can reconfigure the UE accordingly.

To determine the optimal radio configuration, information pertaining to energy related aspects associated to a UE and/or associated to the network serving the UE is used. Such information can be obtained, e.g. using one more of the following:

(1) Information reported by a UE to a network node, e.g. such as described in a related application being filed concurrently herewith, titled "Rich UE feedback for improved ML-based energy efficiency." For example, a UE may report to a network node an Energy Efficiency (EE) feedback associated to at least one UE-related configuration provided by the network node, or a UE may report EE feedback about multiple configurations.

(2) Information stored (e.g., logged) at the UE and reported to a network node, e.g. such as described in a related application being filed concurrently herewith, titled "Methods for enabling UEs to log, store and report energy state assistance information to a network node."

(3) Information related to energy related metrics pertaining to a UE, collectively indicated as "UE associated Energy State Assistance Information" (UE-ESAI). UE-ESAI can include one or more of:

A time stamp or time interval associated to or indicating the time that the remaining content of the UE-ESAI was measured, obtained, stored, and/or received.

UE specific information related to energy related aspects ("UE-ESAI metrics").

Indications pertaining to operational conditions and/or configurations under which UE-ESAI is stored (e.g., logged).

A node (e.g., a RAN node) can send to a UE a configuration, pertaining to storing (e.g., logging) and/or reporting UE-ESAI for a UE, comprising:

aspects regulating how storing (e.g., logging) UE-ESAI is done at the UE.

aspects regulating what information is comprised in UE-ESAI.

aspects regulating how stored (e.g., logged) UE-ESAI is reported by the UE.

(4) Information derived at network nodes, e.g. at a RAN node, either in the form of absolute metrics indicating energy consumption/energy efficiency or indicating a delta variation in energy consumption/energy efficiency, e.g., such as described in a related application being filed concurrently herewith, titled "Methods for inter-node reporting of energy consumption related information."

At least the following MR-DC procedures are relevant, as specified in 3GPP TS 37.340 v16.5.0 for EN-DC and/or MR-DC with 5GC:

Secondary Node Addition

Secondary Node Modification (MN/SN initiated)

Secondary Node Release (MN/SN initiated)

Secondary Node Change (MN/SN initiated)

PSCell change

Inter-Master Node handover with/without Secondary Node change

Master Node to eNB/gNB Change eNB/gNB to Master Node change

Depending on the MR-DC procedure, different nodes (e.g., RAN nodes) may be involved: a first RAN node, and/or a second RAN node, and/or a third RAN node and/or a fourth RAN node. For example, and as used herein to describe certain examples, a first RAN node and a fourth RAN node indicate RAN nodes acting as MN, and they can serve a UE in single connectivity or in MR-DC together with a second network node or a third network node; and a second RAN node and a third RAN node indicate RAN nodes acting as SN, and they can serve a UE in MR-DC with the first network node or the fourth network node.

To determine a radio configuration for a UE in MR-DC that considers energy related aspects, and for configuring the UE with such a configuration, one or more of the following steps may be performed:

retrieving energy related information associated to a UE (or a group of UEs)

retrieving energy related information associated to one or more network nodes (e.g., network nodes involved in the MR-DC operation)

determining an optimal configuration that considers energy savings and performances of the UE in MR-DC operation selecting a final configuration for a UE in MR-DC (striving to achieve the objectives of energy savings and UE performances, but including also additional constraints)

(re) configuring a UE with the agreed configuration (if needed)

Retrieving energy related information associated to a UE (or a group of UEs) and/or one or more network nodes:

The exchange of energy related information associated to one or more UEs and/or one or more network nodes involves one or more network nodes, and/or one or more UEs. A source network node may be, for example, one of the RAN nodes involved in MR-DC procedures and operations, or another RAN node, or an OAM node, or a CN node, or an SMO node, or another entity. A target network node may be one of the RAN nodes involved in MR-DC procedures and operations, or another RAN node, or an OAM node, or a CN node, or an SMO node, or another entity.

Exchanging energy related information associated to one or more UEs may include one or more of the following procedures (possibly executed multiple times):

procedures between network nodes:

(1) A source network node can send and/or forward to a target network node, information associated to energy related aspects of one or more UEs and/or of the source network node, collected at the source network node. For example, sending can be performed via direct signaling between the source network node and the target network node (e.g. over XnAP or X2AP), or via indirect signaling (e.g. sent from a source RAN node to OAM/CN and then from OAM/CN to a target RAN node).

(2) A source network node can request a target network node to obtain from one or more UEs involved in MR-DC procedures (or expected to be involved in MR-DC procedures in a future time interval), information associated to energy related aspects of the UEs, e.g., before, during, and/or after a MR-DC related procedure.

(3) A source network node can request a target network node to provide information associated to energy related aspects of the UEs involved in MR-DC procedures (or expected to be involved in MR-DC procedures in a future time interval), or to report the second network node's energy related metrics before, during, and/or after a MR-DC related procedure.

(4) A source network node can send an indication to a target network node, indicating at least one of the following:

that information associated to energy related aspects of the UEs involved in MR-DC operation (or expected to be involved in MR-DC operation in a future time interval) is available at the source network node;

that information associated to energy related aspects of the UEs involved in MR-DC operation (or expected to be involved in MR-DC operation in a future time interval) can be requested by the source network node to UEs on behalf of the target network node upon request from the target network node;

that the target network node can request the said information from the source network node, information associated to energy related aspects of the UEs involved in MR-DC operation before/during/after a MR-DC related procedure;

that information associated to energy related aspects of the source network node is available at the source network node;

that the target network node can request the said information from the source network node, information associated to energy related aspects of the source network node involved in MR-DC operation before, during, and/or after a MR-DC related procedure; and information about the energy efficiency metrics of the sending node In one example, related to the MR-DC procedure "Secondary Node Change", the source network node can be the MN node and the target node can be the target SN node. The MN node can send an indication to the SN node, indicating that the target SN node can make a request to the MN (e.g. after completion of a SN Change procedure) to retrieve the UE-ESAI from the UE and to send it to SN.

In another example, related to the MR-DC procedure "Secondary Node Modification", the source network node can be the MN node and the target node can be the target SN node. The MN node can signal to the target network node its energy efficiency metrics together with a new configuration for the UE. The target network node may select a new UE configuration as a consequence of receiving the Secondary Node Modification Request and it may include in the message its energy efficiency metrics. Source and target nodes may therefore acquire knowledge of the energy efficiency level of each node, under a given configuration. It should be specified that the roles of first and second network nodes could be inverted, i.e. the source network node can be the SN node and the target node can be the target MN node and the procedure would still be applicable, namely the SN may initiate an action of reconfiguration for network based energy efficiency reasons towards the UE, and in order to perform such action the SN may start signaling to the MN via SN initiated Secondary Node Modification.

(5) A source network node can send an indication to a target network node, indicating that UEs involved in MR-DC operation (or expected to be involved in MR-DC operation in a future time interval), are configured for collecting and/or reporting information associated to energy related aspects of the UE. Based on such indication, the target network node can request the source node (or the UEs) to signal and/or transfer the said information to the target node, before, during, and/or after a MR-DC related procedure.

In one example, related to the MR-DC procedure "Secondary Node Addition", the source network node can be the MN node, and the target network node can be SN node. The MN node can send an indication to the SN node, indicating that the UE involved in the MR-DC procedure, is currently configured to log UE-ESAI. Based on this indication, the SN node can request to the MN node (e.g. after completion of the SN Addition procedure) to retrieve the UE-ESAI from the UE and send it to SN.

procedures between a network node and a UE:

(6) A first network node can trigger and/or (re) configure and/or request UEs to report to the first network node (directly or indirectly via a second network node) information associated to energy related aspects of the UE, to be used by the first network node and/or by the second network node and/or by a third network node. Such trigger, (re) configuration, and/or request can occur prior to, during, and/or after completion of a MR-DC related procedure.

As a first example, a second RAN node (acting as SN), can request to a UE, to provide UE-ESAI or EE feedback to the SN via a first RAN node (acting as MN). E.g. the SN can include, within an RRC Reconfiguration message used as part of the SN Addition procedure, information elements indicating a request for the UE to provide UE-ESAI or EE feedback to the second RAN node.

As an additional example, a second RAN node (used as SN), after an MR-DC procedure is completed, can send to a UE a message (e.g. an RRC Reconfiguration message) requesting the UE to send UE-ESAI or EE feedback to the second RAN node.

As a further example, a first RAN node (used as MN), after an MR-DC procedure is completed, can send to a UE a message (e.g. an RRC Reconfiguration message) requesting the UE to report UE-ESAI or EE feedback, which will be further forwarded to a second RAN node (acting as SN).

(7) A UE can send an indication to a network node (typically one of the RAN nodes involved in MR-DC procedures and operations), indicating that information associated to energy related aspects of the UE (e.g. UE-ESAI or EE feedback) is available at the UE and can be retrieved upon request by a network node.

For example, during an SN Addition procedure, the UE can send to the RAN node acting as MN, an indication, as part of an RRC Connection Reconfiguration Complete procedure, indicating that UE-ESAI is available.

A first network node can obtain information associated to energy related aspects of the UEs directly from the UEs, or indirectly via a second network node. As an example, a SN node can receive UE-ESAI from a UE directly from the UE (e.g. using SRB3) or indirectly via the MN (e.g. UE sends UE-ESAI to the MN using SRB1/SRB2 and the information is then forwarded to the SN over X2AP).

Information associated to energy related aspects of a UE used in determining the optimal radio configuration for a specific UE can pertain to the same UE for which the said radio configuration is being determined, and/or it can pertain to other UEs. For example, other UEs may have one or more aspects in common with the UE for which the radio configuration is being determined, e.g.:

same or similar radio capabilities (e.g. in terms of supported bands, band combinations, feature sets, carrier aggregation parameters, MIMO parameters, MR-DC parameters, etc.);

same or similar performance requirements (e.g. executing same services); and same or similar terminal characteristics (e.g. IMEI SV).

Determining a radio configuration that considers energy savings and performances of UE and/or network in MR-DC: The optimal radio configuration for MR-DC may be based on energy efficiency/savings aspects at the UE and at the network. For example, the optimal radio configuration may be determined considering one or more of the following:

Energy related aspects associated to one or more UEs, e.g. when camped on, served by, and/or connected to at least one of the RAN nodes involved in MR-DC procedures and operations.

Energy related aspects from each of the nodes participating in the dual connectivity configuration towards the UE.

UE capabilities, e.g. capabilities related to supported bandwidths, band combinations, feature sets (e.g., per component carrier, in UL and DL), carrier aggregation parameters, MIMO parameters per band, MR-DC parameters, modulations in UL and DL.

Fulfillment of QoS requirements for the UE (e.g. bitrate, delay, jitter, packet error rate).

End-user preferences impacting energy savings (e.g. RAT, bands, service enabled, WIFI, etc.).

MR-DC procedures.

For at least one of the nodes involved in a MR-DC procedures and operations, the optimal radio configuration may be determined by further considering one or more of the following:

Type of node (e.g., MN or SN).

Supported bandwidths, band combinations, feature sets (e.g., per component carrier, in UL and DL), carrier aggregation parameters, MIMO parameters per band, MR-DC parameters, MR-DC parameters, UL modulations, DL modulations.

QoS parameters setting and QoS fulfillment, e.g. per-5QI Resource Type, Default Priority Level, Packet Delay Budget, Default Maximum Data Burst Volume, Default Averaging Window.

Performance indicators (e.g., integrity, accessibility, retainability, mobility).

Acceptable levels for the performance indicators: for example the operator can indicate an acceptable level of performance that cannot be degraded due to energy savings, valid for a RAN node, for a cell, for a carrier frequency, for a group of UEs or for an individual UE.

Other static/semi-static configuration parameters that can impact network resources dedicated to the UEs (e.g. admission and/or congestion control parameters).

Selecting a radio configuration for a UE involved in MR-DC: Selecting a radio configuration to be applied to a UE may include one or more of the following steps:

1. At least one of the nodes (e.g., RAN nodes) involved in MR-DC (an SN node or an MN node) determines a radio configuration for the UE or obtains a radio configuration for the UE from another node (e.g. inferred by another network node and sent to the RAN node). For example, a configuration can be transferred from one network node to another network node (e.g. from MN to SN, or from OAM to MN), and the radio configuration may comprise radio configuration aspects concerning one or more one of the network nodes involved in MR-DC operation.

2. One of the RAN nodes involved in MR-DC (an SN node or an MN node) determines if a reconfiguration of the UE is needed or not (e.g. the current configuration of the UE may coincide with the one already in use) on the basis of evaluation of the current energy efficiency of the UE and/or of the network and on the basis of whether the new configuration may improve the energy efficiency status at the UE and/or at the network.

3. Optionally, and prior to the phase where the radio configuration is applied to the UE, a negotiation phase between the nodes (MN nodes and/or SN nodes) involved in MR-DC procedures or operations can be conducted. This phase can be used, for example, if more than one node can independently determine a radio configuration for the UE which considers energy related aspects for the UE (in which case a final configuration needs to be found). Another scenario where this negotiation phase can be useful is to account for dynamics that can impact the resources to assign to a UE, and that were not considered (or known) when the radio configuration was inferred (e.g. the load of one the carrier has suddenly increased, becoming too high). During this phase, at least one interaction may be carried out between the nodes (MN nodes and/or SN nodes) involved in MR-DC procedures or operations. These interactions may include one or more of:

The source node indicating to the target node a proposed radio configuration for the UE. The proposed radio configuration may comprise radio configuration aspects concerning the source node and/or radio configuration aspects concerning the target node.

The source node receiving from the target node one of: (1) an acknowledgement/confirmation; (2) a failure/refusal; (3) a proposed update for the radio configuration; and (4) no response. The proposed updated radio configuration may comprise radio configuration aspects concerning the source node and/or radio configuration aspects concerning the target node Applying the radio configuration to the UE: Applying the radio configuration to a UE may include one or more of the following steps:

1. A node (an SN node or an MN node) reconfigures the UE according to a configuration determined in the previous steps.

2. The node reconfiguring the UE receives from the UE a response, indicating if the reconfiguration has been successfully applied by the UE or not.

3. The node reconfiguring the UE can optionally inform at least one of the other nodes involved in MR-DC of the outcome of the operation UE energy savings preferences for MR-DC operations: A UE can indicate or request to a node (e.g., RAN node), UE energy saving preferences related to MR-DC operations.

Disclaimers

The term RAN node or network node can refer to LTE or NR technology and may be, for example, one of eNB, gNB, en-gNB, ng-eNB, CU-CP, CU-UP, DU, gNB-CU, gNB-DU, gNB-CU-UP, gNB-CU-CP, eNB-CU, eNB-DU, eNB-CU-UP, eNB-CU-CP, IAB-node, IAB-donor DU, IAB-donor-CU, IAB-DU, IAB-MT, O-CU, O-CU-CP, O-CU-UP, O-DU, O-RU, O-eNB.

For reasons of simplicity the case of MR-DC is used in the description. However, the methods apply to multi connectivity configurations as well, where one UE is configured to be served by more than two nodes.

The term "transmit to" means "transmit directly or indirectly to." Accordingly, transmitting a message to a node encompasses transmitting the message directly to the node or transmitting the message indirectly to the node such that the message is relayed to the node via one or more intermediate nodes.

Examples of the general flow of operations are provided. The figures show examples of MR-DC procedures for EN-DC, where a radio configuration is determined based on energy related aspects for the UE, and the UE is reconfigured accordingly. The examples should not be regarded as limiting, and simplifications are made to make the diagrams more readable.

For example, for simplicity of representation, in all the provided examples, one of the RAN nodes is the network node where the radio configuration for the UE in MR-DC is inferred, which may not be so in the general case. Also, at least some steps of the MR-DC procedures are grouped in a common box, and the place where the box is shown within the general flow, is not indicative of the order with which the said steps are executed, but it should be regarded only as an indication of their presence.

As general consideration, information associated to energy related aspects for UEs in MR-DC can be used for training AI/ML models, and the said training can be performed at a RAN node, or another network node such as OAM, SMO, or another entity external to RAN.

Example 1—Secondary Node Addition

Figure 8:
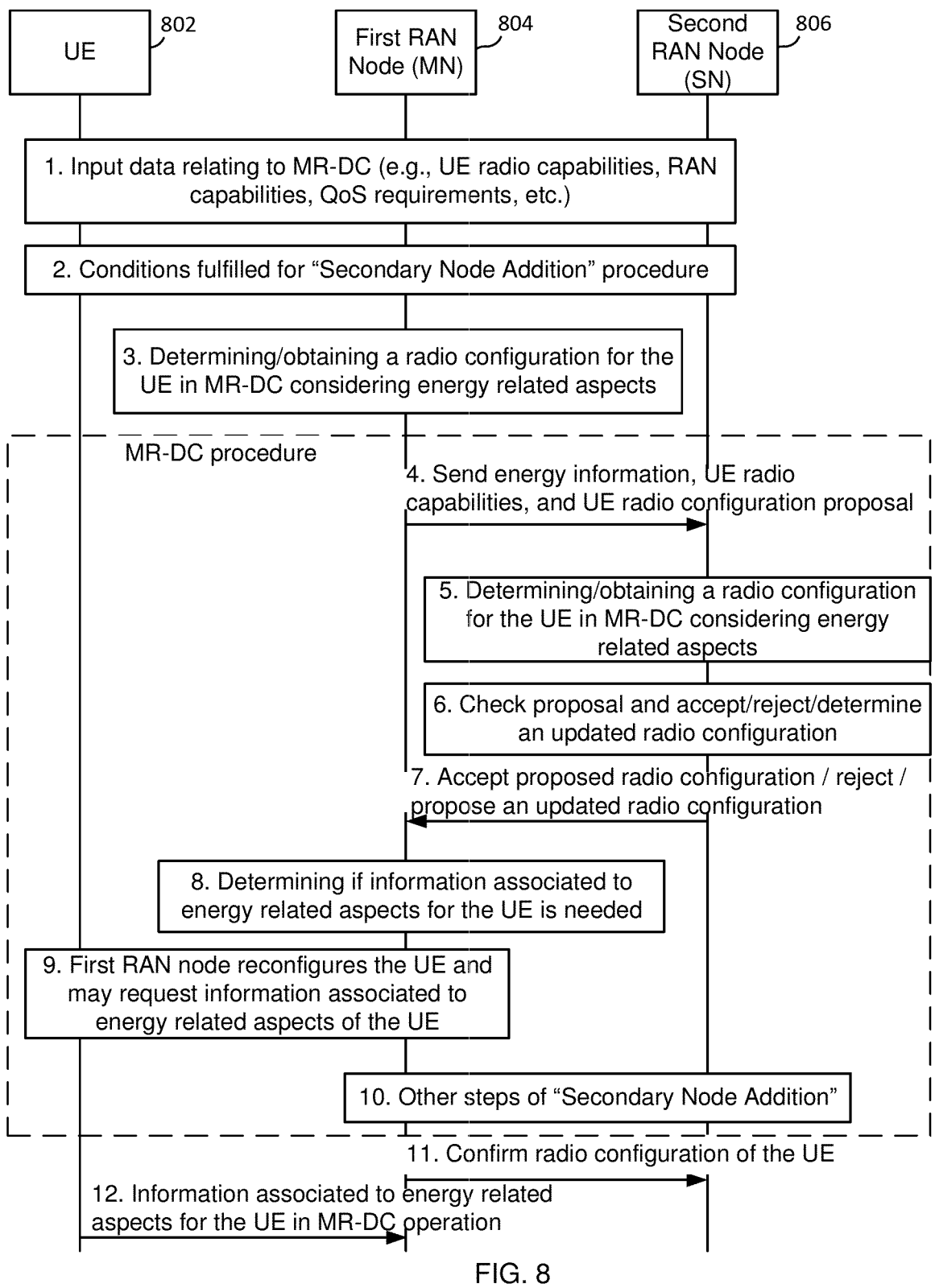
FIG. 8 illustrates a flow diagram according to some embodiments.

FIG. 8 illustrates a flow diagram according to an embodiment. As shown, in connection with Secondary Node Addition, a UE is reconfigured with a radio configuration that considers energy related aspects for the UE.

The first RAN node is the Master Node (MN), the second RAN node is the Secondary Node (SN) of the MR-DC procedure.

In step 1, input data related to MR-DC are made available at the RAN nodes involved in MR-DC procedures (e.g. UE radio capabilities, RAN capabilities, QoS requirements, etc.).

In step 2, the conditions to initiate the procedure "Secondary Node Addition" are fulfilled.

In step 3, the first RAN node determines and/or obtains a radio configuration for the specific UE in MR-DC that considers energy related aspects for the UE.

In step 4, the first RAN node sends to the second RAN node one or more messages, comprising one or more of: (a) information concerning UE radio capabilities for the specific UE, (b) information associated to energy related aspects of the specific UE, and (c) a proposal for a radio configuration for the specific UE in MR-DC that considers energy related aspects of the UE. In a possible example implementation, one of the messages sent in step 4 can be the SGNB ADDITION REQUEST X2AP message. The information sent can be used by the second RAN node for determining/ obtaining a radio configuration for the UE in MR-DC.

In step 5 (optional), the second RAN node determines or obtains from another network node a radio configuration for the specific UE in MR-DC that considers energy related aspects for the UE.

In step 6 (optional), the second RAN node checks the proposal received in step 4 and determines if it can be accepted or not, or it determines an updated radio configuration to be sent to the first RAN node. As an example, to determine an updated radio configuration, the second RAN node can use additional inputs, such as configuration parameters available (or known) at the second RAN node and not available (or known) at the first RAN node.

In step 7 (optional), the second RAN node sends a message to the first RAN node indicating one or more of: (a) if the proposed radio configuration is accepted, (b) if the proposed radio configuration is rejected, and (c) an update of the proposed radio configuration for the UE. In a possible example of implementation, one of the messages sent in step 7 can be the SGNB ADDITION REQUEST ACKNOWLEDGE X2AP message.

In step 8 the first RAN node determines if information associated to energy related aspects for the UE involved in the current MR-DC procedure is needed or not.

In step 9 the first RAN node reconfigures the UE and may make a request to the UE for information associated to energy related aspects of the UE.

In step 10, other steps of the MR-DC procedure (in the example: Secondary Node Addition) are executed.

In step 11 (optional), the first RAN node informs the second RAN node that a new radio configuration that consider energy saving aspects for the UE has been applied to the UE.

In step 12, the first RAN node obtains information associated to energy related aspects for the specific UE. This can be achieved as described herein, or by other methods, e.g. such as those described in related applications being filed concurrently herewith and titled "Rich UE feedback for improved ML-based energy efficiency" and "Methods for enabling UEs to log, store and report energy state assistance information to a network node."

The information associated to energy related aspects for the UE sent in step 4 can be used by the second RAN node, e.g., in step 5, to determine the radio configuration for the UE and/or to train and/or optimize an AI/ML algorithm used in step 5 to determine the radio configuration of the UE.

Example 2—Secondary Node Change

Figure 9:
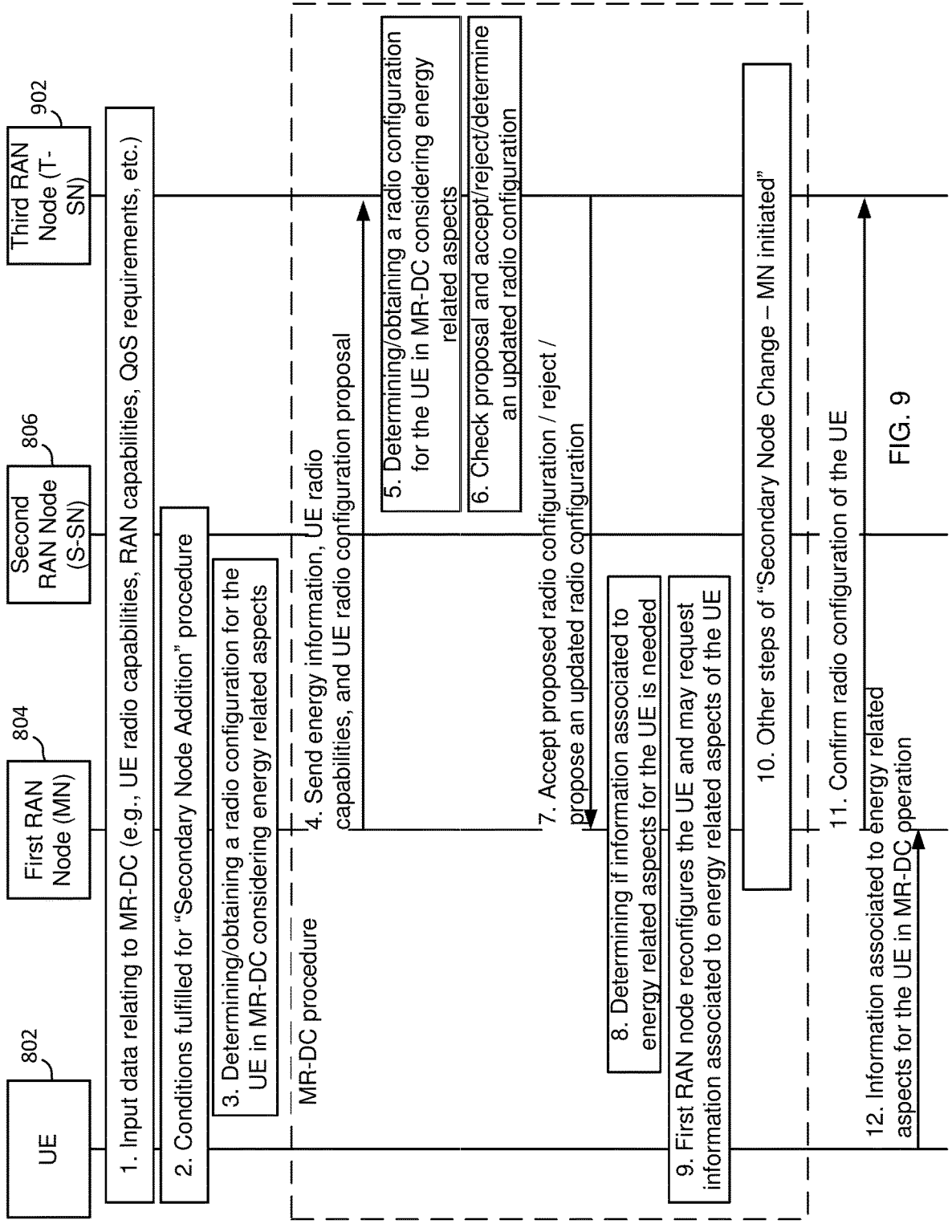
FIG. 9 illustrates a flow diagram according to some embodiments.

FIG. 9 illustrates a flow diagram according to an embodiment. As shown, in connection with Secondary Node Change (MN initiated), a UE is reconfigured with a radio configuration that considers energy related aspects for the UE.

The first RAN node is the Master Node (MN), the second RAN node is the Source Secondary Node (S-SN) and the third RAN node is the Target Secondary Node (T-SN) of the MR-DC procedure.

In step 1, input data related to MR-DC are made available at the RAN nodes involved in MR-DC procedures (e.g. UE radio capabilities, RAN capabilities, QoS requirements, etc.).

In step 2, the conditions to initiate the procedure "Secondary Node Change-MN initiated" are fulfilled.

In step 3, the first RAN node determines or obtains from another network node a radio configuration for the specific UE in MR-DC and which considers energy related aspects for the UE.

In step 4, the first RAN node sends to the third RAN node one or more messages, comprising one or more of: (a) information concerning UE radio capabilities for the specific UE, (b) information associated to energy related aspects of the specific UE, and (c) a proposal for a radio configuration for the specific UE in MR-DC that considers energy related aspects for the UE. The information sent can be used by the third RAN node for determining a radio configuration for the UE in MR-DC. In a possible example implementation, one of the messages sent in step 4 can be the SGNB ADDITION REQUEST X2AP message.

In step 5 (optional), the third RAN node determines/obtains a radio configuration for the specific UE in MR-DC that considers energy related aspects for the UE.

In step 6 (optional), the third RAN node checks the proposal received in step 4 and determines if it can be accepted or not, or it determines an updated radio configuration to be sent to the first RAN node. As an example, to determine an updated radio configuration, the third RAN node can use additional inputs, such as configuration parameters available (or known) at the second RAN node and not available (or known) at the first RAN node.

In step 7 (optional), the third RAN node sends a message to the first RAN node indicating one or more of: (a) if the proposed radio configuration is accepted, (b) if the proposed radio configuration is rejected, and (c) an update in the proposed radio configuration for the UE. In a possible example of implementation, one of the messages sent in step 7 can be the SGNB ADDITION REQUEST ACKNOWL-EDGE X2AP message.

In step 8 the first RAN node determines if information associated to energy related aspects for the UE involved in the current MR-DC procedure is needed or not.

In step 9 the first RAN node reconfigures the UE and may make a request to the UE for information associated to energy related aspects of the UE.

In step 10, other steps of the MR-DC procedure (in the example: Secondary Node Change-MN initiated) are executed.

In step 11 (optional), the first RAN node informs the second RAN node that a new radio configuration that consider energy saving aspects for the UE has been applied to the UE.

In step 12, the first RAN node obtains information associated to energy related aspects for the specific UE. This can be achieved as described herein, or by other methods, e.g. such as those described in related applications being filed concurrently herewith and titled "Rich UE feedback for improved ML-based energy efficiency" and "Methods for enabling UEs to log, store and report energy state assistance information to a network node."

The information associated to energy related aspects for the UE sent in step 4 can be used by the third RAN node, e.g., in step 5, to determine the radio configuration for the UE and/or to train and/or optimize an AI/ML algorithm used in step 5 to determine the radio configuration of the UE.

Example 3—Inter-MN Handover with/without MN Initiated SN Change

Figure 10:
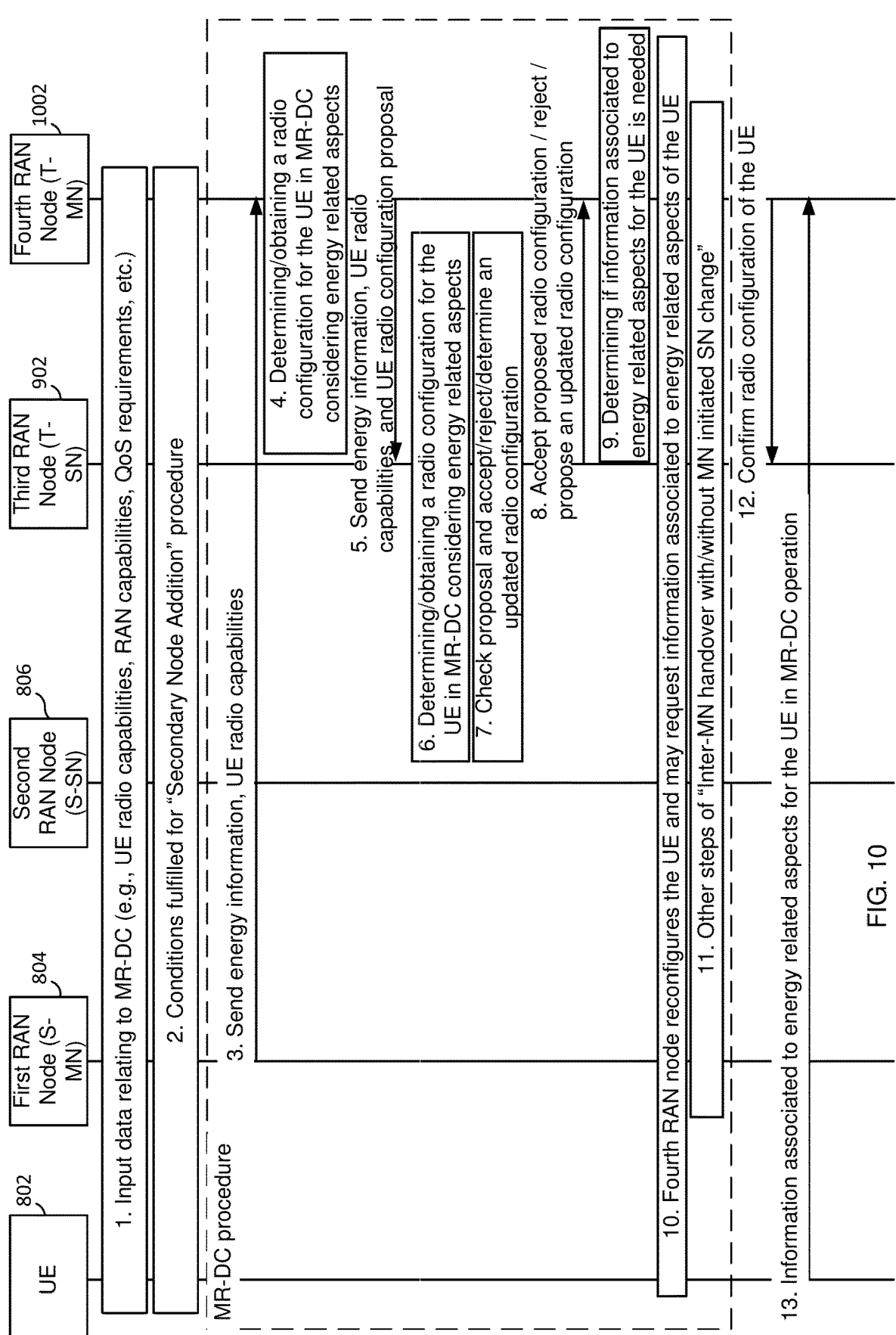
FIG. 10 illustrates a flow diagram according to some embodiments.

FIG. 10 illustrates a flow diagram according to an embodiment. As shown, in connection with Inter-MN handover with/without MN initiated SN change, a UE is reconfigured with a radio configuration that considers energy related aspects for the UE.

The first RAN node is the Source Master Node (S-MN), the second RAN node is the Source Secondary Node (S-SN), the third RAN node is the Target Secondary Node (T-SN), and the fourth RAN node is the Target Master Node (T-MN) of the MR-DC procedure.

In step 1, input data related to MR-DC are made available at the RAN nodes involved in MR-DC procedures (e.g. UE radio capabilities, RAN capabilities, QoS requirements, etc.).

In step 2, the conditions to initiate the procedure "Inter-MN handover with/without MN initiated SN change" are fulfilled.

In step 3, the first RAN node sends to the fourth RAN node one or more messages, comprising one or more of: (a) information concerning UE radio capabilities for the specific UE, and (b) information associated to energy related aspects of the specific UE. The information sent can be used by the fourth RAN node for determining a radio configuration for the UE in MR-DC.

In step 4, the fourth RAN node determines or obtains from another network node a radio configuration for the specific UE in MR-DC that considers energy related aspects for the UE.

In step 5 (optional), the fourth RAN node sends to the third RAN node one or more messages, comprising one or more of: (a) information concerning UE radio capabilities for the specific UE, (b) information associated to energy related aspects of the specific UE, and (c) a proposal for a radio configuration for the specific UE in MR-DC that considers energy related aspects for the UE. In a possible example implementation, one of the messages sent in step 5 can be the SGNB ADDITION REQUEST X2AP message.

In step 6 (optional), the third RAN node determines or obtains from another network node a radio configuration for the specific UE in MR-DC that considers energy related aspects for the UE.

In step 7 (optional), the third RAN node checks the proposal received in step 5 and determines if it can be accepted or not, or it determines an updated radio configuration to be sent to the fourth RAN node. As an example, to determine an updated radio configuration, the third RAN node can use additional inputs, such as configuration parameters available (or known) at the second RAN node and not available (or known) at the fourth RAN node.

In step 8 (optional), the third RAN node sends a message to the fourth RAN node indicating one or more of: (a) if the proposed radio configuration is accepted, (b) if the proposed radio configuration is rejected, and (c) an update in the proposed radio configuration for the UE. In a possible example of implementation, one of the messages sent in step 8 can be the SGNB ADDITION REQUEST ACKNOWL-EDGE X2AP message.

In step 9 the first RAN node determines if information associated to energy related aspects for the UE involved in the current MR-DC procedure is needed or not.

In step 10 the first RAN node reconfigures the UE and may make a request to the UE for information associated to energy related aspects of the UE.

In step 11, other steps of the MR-DC procedure (in the example: Inter-MN handover with/without MN initiated SN change) are executed.

In step 12 (optional), the fourth RAN node informs the third RAN node that a new radio configuration that consider energy saving aspect for the UE has been applied to the UE.

In step 13, the first RAN node obtains information associated to energy related aspects for the specific UE.

The information associated to energy related aspects for the UE sent in step 3 can be used by the fourth RAN node, e.g., in step 4 to determine the radio configuration for the UE and/or to train and/or optimize an AI/ML algorithm used in step 4 to determine the radio configuration of the UE.

The information associated to energy related aspects for the UE sent in step 5 can be used by the third RAN node, e.g., in step 6 to determine the radio configuration for the UE and/or to train and/or optimize an AI/ML algorithm used in step 6 to determine the radio configuration of the UE.

Example 4—Secondary Node Modification

In this example the first RAN node is the MN, and the second RAN node is the SN of the MR-DC procedure. In this example a DC configuration is already in place and an MCG and an SCG are configured for the UE.

The first and second RAN nodes exchange energy efficiency metrics as described in herein, and/or as described in a related application being filed concurrently herewith titled "Methods for inter-node reporting of energy consumption related information." With such information both first and second RAN nodes are aware of the energy efficiency of the other node involved in the DC configuration.

The first or the second RAN node may determine a radio configuration for the UE served in DC that optimizes the energy efficiency of the first or the second RAN node or both. The first and second RAN node exchange signaling messages to reconfigure the UE according to the new configuration. As part of such messages or via new dedicated messages, the first and second RAN nodes exchange their energy efficiency metrics after the new configuration has been applied. This allows first and second RAN nodes to determine whether the newly applied configuration has improved the network energy efficiency.

Additional details regarding these and other embodiments are described below.

In a wireless communication network comprising a UE and network nodes participating in MR-DC related procedures, methods are disclosed enabling a network node to determine/obtain a radio configuration for a UE that considers energy aspects of the UE and/or of the network, e.g. when the UE is reconfigured from single connectivity to dual connectivity, or from dual connectivity to single connectivity, or when at least one network related aspect concerning dual connectivity is updated.

The radio configuration that is determined or obtained may be based on one or more of the following inputs:

Radio capabilities of or supported by the UE and/or network nodes. For example, supported bandwidths, band combinations, feature sets (per component carrier, in UL and DL), carrier aggregation parameters, MIMO parameters per band, MR-DC parameters, MR-DC parameters, UL/DL modulations.

QoS requirements. For example, 5QI configured, per-5QI Resource Type, Default Priority Level, Packet Delay Budget, Default Maximum Data Burst Volume, Default Averaging Window.

QoS requirements fulfillment.

QoE configuration(s).

End-user preferences. For example, selected RAT(s), selected band(s), service-related preference, WIFI setting(s).

Terminal characteristics (e.g. IMEI SV).

Energy saving setting(s) for the UE and network nodes.

The concerned MR-DC procedure(s).

Settings for SRB and/or DRB (e.g. MCG bearer, SCG bearer, split bearer) for each one of the network nodes involved in MR-DC.

PDCP duplication.

TDD pattern configuration.

Role of at least one of the concerned network nodes (e.g. MN or SN).

Measured or predicted traffic for the UE or for a network node.

Traffic management configuration in a network node.

Mobility setting configuration in a network node.

Capacity management configuration in a network node (e.g. concerning admission and/or congestion and/or overload).

Neighbor relation configuration in a network node.

Measured or predicted performance indicators of a network node (e.g. integrity, accessibility, retainability, mobility).

Performance indicators constraints pertaining to a network node or to the UE.

Location of the UE.

Mobility state of the UE.

The process to obtain/determine the radio configuration may include one or more of the following steps:

Requesting and/or retrieving and/or sending and/or forwarding information associated to energy related aspects of the UE in MR-DC. This exchange may occur between one or more UEs and one or more network nodes, and/or between one or more network nodes.

Exchanging energy efficiency metrics between nodes involved in the dual connectivity configuration, where such metrics indicate energy efficiency at each node serving the UE in DC.

Obtaining/determining a radio configuration based at least on one or more of the abovementioned inputs.

Coordinating/negotiating among one or more of the nodes involved in MR-DC radio configuration aspects concerning the connections of the UE towards at least one of nodes involved in MR-DC.

Reconfiguring the UE according to the determined radio configuration.

A network node determining whether to collect information associated to energy related aspects of a UE in MR-DC, and if so requesting the UE to send to a network node information associated to energy related aspects of the UE operating in MR-DC. The request may be made before, as part of, and/or after the reconfiguration of the UE according to the obtained/determined radio configuration.

The radio configuration for the UE can be determined/obtained before a MR-DC procedure is initiated, or during the execution of a MR-DC procedure, or after completion of a MR-DC procedure; and can be sent to the UE as part of a MR-DC procedure, or after completion of a MR-DC procedure.

In one embodiment, the radio configuration can be obtained/determined using AI/ML techniques, and the aspects of model training, validation, inference can be done in different network nodes or the same network node, where a network node can be one of the RAN nodes involved in MR-DC, or another RAN node, an OAM node, a CN node, an SMO, or another entity.

Energy saving aspects associated to a UE can comprise at least one of: (i) information pertaining to or associated with energy related aspects of a UE, e.g. such as those that may be stored (e.g., logged) at the UE, collectively indicated as UE associated Energy Status Assistance Information (UE-ESAI); and (ii) information (feedback) associated to a radio configuration provided to the UE (e.g. indicating a score associated to the energy efficiency of the radio configuration).

Energy saving aspects associated to a UE can include information derived at network nodes, e.g. at a RAN node, either in the form of absolute metrics indicating energy consumption/energy efficiency or indicating a delta variation in energy consumption/energy efficiency.

In one embodiment, procedures are executed (possibly multiple times) between a source network node and a target network node, in order for the source network node and/or the target network node to obtain information associated to energy related aspects of the UE. A source node can be one of the RAN nodes involved in MR-DC procedures and operations, or another RAN node, or an OAM node, or a CN node, or an SMO node, or another entity. A target network node can be one of RAN nodes involved in MR-DC procedures and operations, or another RAN node, or an OAM node, or a CN node, or an SMO node, or another entity. The procedures may include:

The source network node sending and/or forwarding to the target network node, information associated to energy related aspects of a UE and/or of the source network node, collected at the source network node. For example, sending and forwarding can be repeated throughout multiple network nodes.

The source network node requesting the target network node to obtain from one or more UEs involved in MR-DC procedures (or expected to be involved in MR-DC procedures in a future time interval), information associated to energy related aspects of the UEs, before, during, and/or after a MR-DC related procedure.

The source network node requesting the target network node to obtain from the target network node, information associated to energy related aspects of UEs, pertaining to UEs involved in MR-DC procedures (or expected to be involved in MR-DC procedures in a future time interval), or to report the target network node's energy related metrics before, during, and/or after a MR-DC related procedure.

The source network node sending an indication to the target network node, indicating that information associated to energy related aspects for the UEs involved in MR-DC operation (or expected to be involved in MR-DC operation in a future time interval) is available at the source network node and may be requested by the target network node from the source network node, before, during, and/or after the MR-DC related procedure.

The source network node sending an indication to the target network node, indicating that a UE involved in MR-DC operation (or expected to be involved in MR-DC operation in a future time interval), is configured for collecting and/or reporting information associated to energy related aspects of the UE. Based on such indication, the target network node can request the source node (or the UE) to retrieve the said information, before, during, and/or after a MR-DC related procedure.

The source network node sending an indication to the target network node indicating one or more of (i) that information associated to energy related aspects of the source network node is available at the source network node, (ii) that the target network node can request the said information from the source network node, information associated to energy related aspects of the source network node involved in MR-DC operation before, during, and/or after a MR-DC related procedure, and (iii) information about the energy efficiency metrics of the sending node.

In one embodiment, procedures are executed between a network node and a UE, in order for the network node to obtain energy saving aspects associated to the UE. For example, a network node can be one of the RAN nodes involved in MR-DC procedures and operations, or another RAN node, or an OAM node, or a CN node, or an SMO node, or another entity, and the said procedures can comprise: (i) the network node triggering and/or (re) configuring and/or requesting a UE or a network node to report information associated to energy related aspects to be used by the same network node and/or by another network node. Such trigger/(re) configuration/request can occur prior to, during, and/or after completion of a MR-DC related procedure; and (ii) the UE sending an indication to the network node (typically one of the RAN nodes involved in MR-DC procedures and operations), indicating that information associated to energy related aspects of the UE is available at the UE and can be retrieved upon request.

In one embodiment, data used for training a AI/ML model can comprise information associated to energy related aspects pertaining to the UE for which the radio configuration is being determined, or to other UEs with the same or similar characteristics as the UE for which the radio configuration is being determined, for one or more of:

radio capabilities support of the UE(s)
QoS requirements
QoS requirements fulfillment
QoE configuration(s)
End-user preferences
Terminal characteristics
Energy saving setting(s)
Concerned MR-DC procedure(s)
Settings for SRB and/or DRB (e.g. MCG bearer, SCG bearer, split bearer)
PDCP duplication
TDD pattern configuration
Measured or predicted traffic for the UE
Performance indicators constraints.
Location of the UE.
Mobility state of the UE In one embodiment, a RAN node involved in MR-DC procedures and operations for the UE, determines or obtains a radio configuration for the UE that considers energy related aspects of the UE, and the method can be used when transitioning the UE from single connectivity to dual connectivity, or from dual connectivity to single connectivity, or between different configurations of dual connectivity. The obtained/determined radio configuration may comprise radio configuration aspects concerning the one or more of the RAN nodes comprised in a MR-DC procedure.

In one embodiment, a RAN node, involved in MR-DC procedures and operations for the UE, determines if a reconfiguration of the UE is needed by checking if the current radio configuration of the UE is the same or different compared to one determined or obtained by a network node.

In another embodiment, prior to reconfiguring the UE, a negotiation phase is conducted between at least two nodes (e.g., a source RAN node and a target RAN node), involved in a MR-DC procedure. The negotiation phase may include at least one interaction between the source RAN node and the target RAN node, comprising the source RAN node indicating to the target RAN node a proposed radio configuration for the UE. The proposed radio configuration may comprise radio configuration aspects concerning the source RAN node and/or radio configuration aspects concerning the target RAN node. The interaction may further comprise the source RAN node receiving from the target RAN node one of: (1) an acknowledgement/confirmation; (2) a failure/refusal; (3) a proposed update for the radio configuration; and (4) no response. The proposed update for the radio configuration may comprise radio configuration aspects concerning the source RAN node and/or radio configuration aspects concerning the target RAN node.

In another embodiment, a RAN node reconfigures a UE according to a radio configuration determined according to any of the embodiments disclosed herein.

In another embodiment, a RAN node receives from a UE an indication, indicating that the new radio configuration has been successfully applied or failed.

In another embodiment, a RAN node may optionally send an indication to at least one of the other RAN nodes involved in MR-DC procedures and operations, indicating the outcome of the reconfiguration.

UE energy savings preferences for MR-DC operation are now described.

In one embodiment, a UE can send to a RAN node, indications or requests pertaining to UE preferences when operating in MR-DC, in terms of energy related aspects. Non-limiting examples are:

One or more preferred settings pertaining to radio configurations (e.g. Frequency Range, bandwidth, TDD pattern, number of MIMO layers, etc.). In one example, the UE can send an indication, indicating that for energy saving purposes, use of carriers on Frequency Range 1 (FR1) is to be preferred compared to use of carriers on Frequency Range 2 (FR2), or that use of carriers on FR2 is precluded.

A score, indicating a preference of the UE when operating in one type of MR-DC compared to another (e.g. EN-DC may be preferred compared to NR-DC, or EN-DC using NR carrier frequencies in FR1 is preferred compared to EN-DC using NR carrier frequencies in FR2). For example a lower score indicating lower preference, or vice versa.

A flag, indicating if MR-DC configuration is not preferred (or should be precluded) compared to single connectivity for energy savings reasons.

A flag, indicating if a potential MR-DC radio configuration or a proposed MR-DC radio configuration is satisfactory for the UE in terms of energy savings/power consumption/energy efficiency. In one example, a UE using a first carrier on Frequency Range 1 (FR1) and measuring a second carrier on Frequency Range 2 (FR2) can report to a RAN node, measurements pertaining to the second carrier, and include in the report a flag indicating that using the second carrier in MR-DC (e.g. EN-DC) together with the first carrier on FR1 is not preferred in terms of energy savings. The same UE, using the first carrier on FR1, and measuring a third carrier on FR1, can report to a RAN node, measurements pertaining to the third carrier, and include in the report a flag indicating that using the third carrier in MR-DC together with the first carrier on F1, is preferred.

The UE can send to a RAN node indications or requests concerning UE preferences when operating in MR-DC:

prior to a reconfiguration of the UE in MR-DC, or after the UE has been reconfigured in MR-DC.

as part of different procedures, such as mobility related procedures, RRC Setup, RRC Resume, RRC re-establishment.

using existing signaling procedures and messages (such as NR RRC messages "RRC Setup Complete" message, "RRC Reconfiguration Complete", "RRC Resume Complete", "RRC Reestablishment Complete").

using newly defined signaling procedures and messages (such as "Energy Saving Indication" etc.).

Reception of UE preferences at one RAN node: In one embodiment, a RAN node can receive from a UE, indications and/or requests pertaining to UE preferences when operating in MR-DC.

Forwarding of UE preferences between RAN nodes: In one embodiment, a first RAN node, can receive from a second RAN node, indications and/or requests pertaining to UE preferences when operating in MR-DC. The first RAN node and the second RAN node can be two nodes involved in MR-DC operation with the same UE. The first RAN node can be the target node of a mobility procedure involving the UE, and the second RAN node the source node of the same mobility procedure.

In one embodiment, a RAN node involved in MR-DC operation for a UE, can use the indications and/or requests pertaining to UE preferences when operating in MR-DC, as previously received, to determine the radio configuration of the UE in MR-DC.

Examples of Implementation

First Example—X2AP

A first example of implementation is provided for EN-DC procedures for X2AP (3GPP TS 36.423). The current version of TS 36.423, v16.5.0, is provided below, with modifications relevant to this disclosure marked in bold underline.

9.1.4.1 SgNB Addition Request

This message is sent by the MeNB to the en-gNB to request the preparation of resources for EN-DC operation for a specific UE
Direction: MeNB→en-gNB.

| IE/Group Name | Presence | Range | IE type and reference |
|---|---|---|---|
| Message Type | M | | 9.2.13 |
| MeNB UE X2AP ID | M | | eNB UE X2AP ID 9.2.24 |
| NR UE Security Capabilities | M | | 9.2.107 |
| SgNB Security Key | M | | 9.2.101 |
| SgNB UE Aggregate Maximum Bit Rate | M | | UE Aggregate Maximum Bit Rate 9.2.12 |
| Selected PLMN | O | | PLMN Identity 9.2.4 |
| Handover Restriction List | O | | 9.2.3 |
| E-RABs To Be Added List | | 1 | |
| >E-RABs To Be Added Item | | 1 . . . <maxnoofBearers> | |

-continued

| | | |
|---|---|---|
| >>E-RAB ID | M | 9.2.23 |
| >>DRB ID | M | 9.2.122 |
| >>EN-DC Resource Configuration | M | EN-DC Resource Configuration 9.2.108 |
| >>CHOICE Resource Configuration | M | |
| >>>PDCP present in SN | | |
| >>>>Full E-RAB Level QoS Parameters | M | E-RAB Level QoS Parameters 9.2.9 |
| >>>>Maximum MCG admittable E-RAB Level QoS Parameters | C-ifMCGandSCGpresent_GBR | GBR QoS Information 9.2.10 |
| >>>>DL Forwarding | O | 9.2.5 |
| >>>>MeNB DL GTP Tunnel Endpoint at MCG | C-ifMCGpresent | GTP Tunnel Endpoint 9.2.1 |
| >>>>S1 UL GTP Tunnel Endpoint | M | GTP Tunnel Endpoint 9.2.1 |
| >>>>RLC Mode | O | RLC Mode 9.2.119 |
| >>>>Bearer Type | O | 9.2.92 |
| >>>>Ethernet Type | O | 9.2.157 |
| >>>PDCP not present in SN | | |
| >>>>Requested SCG E-RAB Level QoS Parameters | M | E-RAB Level QoS Parameters 9.2.9 |
| >>>>MeNB UL GTP Tunnel Endpoint at PDCP | M | GTP Tunnel Endpoint 9.2.1 |
| >>>>Secondary MeNB UL GTP Tunnel Endpoint at PDCP | O | GTP Tunnel Endpoint 9.2.1 |
| >>>>RLC Mode | M | RLC Mode 9.2.119 |
| >>>>UL Configuration | C-ifMCGandSCGpresent | 9.2.118 |
| >>>>UL PDCP SN Length | O | PDCP SN Length 9.2.133 |
| >>>>DL PDCP SN Length | O | PDCP SN Length 9.2.133 |
| >>>>Duplication activation | O | 9.2.137 |
| MeNB to SgNB Container | M | OCTET STRING |
| SgNB UE X2AP ID | O | en-gNB UE X2AP ID 9.2.100 |
| Expected UE Behaviour | O | 9.2.70 |
| MeNB UE X2AP ID Extension | O | Extended eNB UE X2AP ID 9.2.86 |
| Requested split SRBs | O | ENUMERATED (srb1, srb2, srb1&2, . . . ) |
| MeNB Resource Coordination Information | O | 9.2.116 |
| SGNB Addition Trigger Indication | O | ENUMERATED (SN change, inter-eNB HO, intra-eNB HO, . . . ) |
| Subscriber Profile ID for RAT/ Frequency priority | O | 9.2.25 |
| MeNB Cell ID | M | ECGI 9.2.14 |
| Desired Activity Notification Level | O | 9.2.141 |
| Trace Activation | O | 9.2.2 |
| Location Information at SgNB reporting | O | ENUMERATED (pscell, . . . ) |
| Masked IMEISV | O | 9.2.69 |
| Additional RRM Policy Index | O | 9.2.25a |
| Requested Fast MCG recovery via SRB3 | O | ENUMERATED (true, . . . ) |
| UE Context Reference at Source NG-RAN | O | RAN UE NGAP ID 9.2.152 |
| Management Based MDT Allowed | O | 9.2.59 |
| Management Based MDT PLMN List | O | MDT PLMN List 9.2.64 |
| UE Radio Capability ID | O | 9.2.171 |
| IAB Node Indication | O | ENUMERATED (true, . . . ) |
| Energy saving indication | O | ENUMERATED (true, . . . ) |

| IE/Group Name | Semantics description | Criticality | Assigned Criticality |
|---|---|---|---|
| Message Type | | YES | reject |
| MeNB UE X2AP ID | Allocated at the MeNB | YES | reject |
| NR UE Security Capabilities | | YES | reject |
| SgNB Security Key | The S-KgNB which is provided by the MeNB, see TS 33.401 [18]. | YES | reject |
| SgNB UE Aggregate Maximum Bit Rate | The UE Aggregate Maximum Bit Rate is split into MeNB UE Aggregate Maximum Bit Rate and SgNB UE Aggregate Maximum Bit Rate which are enforced by MeNB and en-gNB respectively. | YES | reject |

-continued

| | | | |
|---|---|---|---|
| Selected PLMN | The selected PLMN of the SCG in the en-gNB. | YES | ignore |
| Handover Restriction List | | YES | ignore |
| E-RABs To Be Added List | | YES | reject |
| >E-RABs To Be Added Item | | EACH | reject |
| >>E-RAB ID | | — | |
| >>DRB ID | | — | |
| >>EN-DC Resource Configuration | Indicates the PDCP and Lower Layer MCG/SCG configuration. | — | |
| >>CHOICE Resource Configuration | | | |
| >>>PDCP present in SN | This choice tag is used if the PDCP at SgNB IE in the EN-DC Resource Configuration IE is set to the value "present". | | |
| >>>>Full E-RAB Level QoS Parameters | Includes the E-RAB level QoS parameters as received on S1-MME. | — | |
| >>>>Maximum MCG admittable E-RAB Level QoS Parameters | Includes the GBR QoS Information admittable by the MCG. | — | |
| >>>>DL Forwarding | | — | |
| >>>>MeNB DL GTP Tunnel Endpoint at MCG | MeNB endpoint of the X2-U transport bearer at MCG. For delivery of DL PDCP PDUs. | — | |
| >>>>S1 UL GTP Tunnel Endpoint | SGW endpoint of the S1-U transport bearer. For delivery of UL PDUs from the en-gNB. | — | |
| >>>>RLC Mode | Indicates the RLC mode at the MeNB for PDCP transfer to en-gNB. | YES | ignore |
| >>>>Bearer Type | | YES | ignore |
| >>>>Ethernet Type | | YES | ignore |
| >>>PDCP not present in SN | This choice tag is used if the PDCP at SgNB IE in the EN-DC Resource Configuration IE is set to the value "not present". | | |
| >>>>Requested SCG E-RAB Level QoS Parameters | Includes E-RAB level QoS parameters requested to be provided by the SCG. | — | |
| >>>>MeNB UL GTP Tunnel Endpoint at PDCP | MeNB endpoint of the X2-U transport bearer. For delivery of UL PDCP PDUs. | — | |
| >>>>Secondary MeNB UL GTP Tunnel Endpoint at PDCP | MeNB endpoint of the X2-U transport bearer. For delivery of UL PDCP PDUs in case of PDCP duplication. | — | |
| >>>>RLC Mode | Indicates the RLC mode to be used in the assisting node. | — | |
| >>>>UL Configuration | Information about UL usage in the en-gNB. | — | |
| >>>>UL PDCP SN Length | Indicates the PDCP SN length of the bearer for the UL. | YES | ignore |
| >>>>DL PDCP SN Length | Indicates the PDCP SN length of the bearer for the DL. | YES | ignore |
| >>>>Duplication activation | Indicated the initial staus of PDCP duplication. | YES | ignore |
| MeNB to SgNB Container | Includes the CG-ConfigInfo message as defined in TS 38.331 [31]. Energy savings aspects for the UE may be included. | YES | reject |
| SgNB UE X2AP ID | Allocated at the en-gNB. | YES | reject |
| Expected UE Behaviour | | YES | ignore |
| MeNB UE X2AP ID Extension | Allocated at the MeNB. | YES | reject |
| Requested split SRBs | Indicates that resources for Split SRB are requested. | YES | reject |
| MeNB Resource Coordination Information | Information used to coordinate resources utilisation between MeNB and en-gNB. | YES | ignore |
| SGNB Addition Trigger Indication | This IE indicates the trigger for SGNB Addition procedure. | YES | reject |
| Subscriber Profile ID for RAT/ Frequency priority | | YES | ignore |
| MeNB Cell ID | Indicates the cell ID for PCell in MeNB. | YES | reject |
| Desired Activity Notification Level | | YES | ignore |
| Trace Activation | | YES | ignore |
| Location Information at SgNB reporting | Indicates that the user's location information is to be provided. | YES | ignore |
| Masked IMEISV | | YES | ignore |
| Additional RRM Policy Index | | YES | ignore |
| Requested Fast MCG recovery via SRB3 | Indicates that the resources for fast MCG recovery via SRB3 are requested. | YES | ignore |
| UE Context Reference at Source NG-RAN | | YES | ignore |
| Management Based MDT Allowed | | YES | ignore |
| Management Based MDT PLMN List | | YES | ignore |
| UE Radio Capability ID | | YES | reject |
| IAB Node Indication | | YES | Reject |
| Energy saving indication | Indicates if the configuration is performed for energy saving reasons | YES | Ignore |

60

| Range bound | Explanation |
|---|---|
| maxnoofBearers | Maximum no. of E-RABs. Value is 256. |

65

| Condition | Explanation |
|---|---|
| ifMCGandSCGpresent | This IE shall be present if, for the E-RAB requested to be added, the MCG resources and SCG resources IEs in the EN-DC Resource Configuration IE are set to the value "present". |
| ifMCGpresent | This IE shall be present if, for the E-RAB requested to be added, the MCG resources IE in the EN-DC Resource Configuration IE is set to the value "present". |
| C-ifMCGandSCGpresent_GBR | This IE shall be present if, for the E-RAB requested to be added, the MCG resources and SCG resources IEs in the EN-DC Resource Configuration IE are set to the value "present", and GBR QoS Information IE is present in Full E-RAB Level QoS Parameters IE. |

9.1.4.2 SgNB Addition Request Acknowledge

This message is sent by the en-gNB to confirm the MeNB about the SgNB addition preparation.

Direction: en-gNB→MeNB.

| IE/Group Name | Presence | Range | IE type and reference |
|---|---|---|---|
| Message Type | M | | 9.2.13 |
| MeNB UE X2AP ID | M | | eNB UE X2AP ID 9.2.24 |
| SgNB UE X2AP ID | M | | en-gNB UE X2AP ID 9.2.100 |
| E-RABs Admitted To Be Added List | | 1 | |
| >E-RABs Admitted To Be Added Item | | 1 . . . <maxnoofBearers> | |
| >>E-RAB ID | M | | 9.2.23 |
| >>EN-DC Resource Configuration | M | | EN-DC Resource Configuration 9.2.108 |
| >>CHOICE Resource Configuration | M | | |
| >>>PDCP present in SN | | | |
| >>>>S1 DL GTP Tunnel Endpoint at the SgNB | M | | GTP Tunnel Endpoint 9.2.1 |
| >>>>SgNB UL GTP Tunnel Endpoint at PDCP | C-ifMCGpresent | | GTP Tunnel Endpoint 9.2.1 |
| >>>>RLC Mode | C-ifMCGpresent | | RLC Mode 9.2.119 |
| >>>>DL Forwarding GTP Tunnel Endpoint | O | | GTP Tunnel Endpoint 9.2.1 |
| >>>>UL Forwarding GTP Tunnel Endpoint | O | | GTP Tunnel Endpoint 9.2.1 |
| >>>>Requested MCG E-RAB Level QoS Parameters | C-ifMCGandSCGpresent_GBRpresent | | E-RAB Level QoS Parameters 9.2.9 |
| >>>>UL Configuration | C-ifMCGandSCGpresent | | 9.2.118 |
| >>>>UL PDCP SN Length | O | | PDCP SN Length 9.2.133 |
| >>>>DL PDCP SN Length | O | | PDCP SN Length 9.2.133 |
| >>>PDCP not present in SN | | | |
| >>>>SgNB DL GTP Tunnel Endpoint at SCG | M | | GTP Tunnel Endpoint 9.2.1 |
| >>>>Secondary SgNB DL GTP Tunnel Endpoint at SCG | O | | GTP Tunnel Endpoint 9.2.1 |
| >>>>LCID | O | | 9.2.138 |
| E-RABs Not Admitted List | O | | E-RAB List 9.2.28 |
| SgNB to MeNB Container | M | | OCTET STRING |
| Criticality Diagnostics | O | | 9.2.7 |
| MeNB UE X2AP ID Extension | O | | Extended eNB UE X2AP ID 9.2.86 |
| Admitted split SRBs | O | | ENUMERATED (srb1, srb2, srb1&2, . . . ) |
| SgNB Resource Coordination Information | O | | 9.2.117 |
| RRC config indication | O | | 9.2.132 |
| Location Information at SgNB | O | | 9.2.142 |
| Available fast MCG recovery via SRB3 | O | | ENUMERATED (true, . . . ) |
| Energy saving indication | O | | ENUMERATED (true, . . . ) |

| IE/Group Name | Semantics description | Criticality | Assigned Criticality |
|---|---|---|---|
| Message Type | | YES | reject |
| MeNB UE X2AP ID | Allocated at the MeNB. | YES | reject |
| SgNB UE X2AP ID | Allocated at the en-gNB. | YES | reject |
| E-RABs Admitted To Be Added List | | YES | ignore |
| >E-RABs Admitted To Be Added Item | | EACH | ignore |
| >>E-RAB ID | | — | |

-continued

| | | | |
|---|---|---|---|
| >>EN-DC Resource Configuration | Indicates the PDCP and Lower Layer MCG/SCG configuration. | — | |
| >>CHOICE Resource Configuration | | | |
| >>>PDCP present in SN | This choice tag is used if the PDCP at SgNB IE in the EN-DC Resource Configuration IE is set to the value "present". | | |
| >>>>S1 DL GTP Tunnel Endpoint at the SgNB | en-gNB endpoint of the S1 transport bearer. For delivery of DL PDUs. | — | |
| >>>>SgNB UL GTP Tunnel Endpoint at PDCP | en-gNB endpoint of the X2-U transport bearer at PDCP. For delivery of UL PDCP PDUs. | — | |
| >>>>RLC Mode | Indicates the RLC mode. | — | |
| >>>>DL Forwarding GTP Tunnel Endpoint | Identifies the X2 transport bearer used for forwarding of DL PDUs | — | |
| >>>>UL Forwarding GTP Tunnel Endpoint | Identifies the X2 transport bearer used for forwarding of UL PDUs | — | |
| >>>>Requested MCG E-RAB Level QoS Parameters | Includes E-RAB level QoS parameters requested to be provided by the MCG. | — | |
| >>>>UL Configuration | Information about UL usage in the MeNB. | — | |
| >>>>UL PDCP SN Length | Indicates the PDCP SN length of the bearer for the UL. | YES | ignore |
| >>>>DL PDCP SN Length | Indicates the PDCP SN length of the bearer for the DL. | YES | ignore |
| >>>PDCP not present in SN | This choice tag is used if the PDCP at SgNB IE in the EN-DC Resource Configuration IE is set to the value "not present". | | |
| >>>>SgNB DL GTP Tunnel Endpoint at SCG | SgNB endpoint of the X2-U transport bearer at the SCG. For delivery of DL PDCP PDUs. | — | |
| >>>>Secondary SgNB DL GTP Tunnel Endpoint at SCG | SgNB endpoint of the X2-U transport bearer at the SCG. For delivery of DL PDCP PDUs in case of PDCP duplication | — | |
| >>>>LCID | LCID for the primary path in case of PDCP duplication | YES | ignore |
| E-RABs Not Admitted List | A value for E-RAB ID shall only be present once in E-RABs Admitted List IE and in E-RABs Not Admitted List IE. | YES | ignore |
| SgNB to MeNB Container | Includes the CG-Config message as defined in TS 38.331[31]. Energy savings aspects for the UE may be included. | YES | reject |
| Criticality Diagnostics | | YES | ignore |
| MeNB UE X2AP ID Extension | Allocated at the MeNB | YES | reject |
| Admitted split SRBs | Indicates admitted SRBs | YES | reject |
| SgNB Resource Coordination Information | Information used to coordinate resources utilisation between en-gNB and MeNB. | YES | ignore |
| RRC config indication | Indicates the type of RRC configuration used at the en-gNB. | YES | reject |
| Location Information at SgNB | Contains information to support localisation of the UE | YES | ignore |
| Available fast MCG recovery via SRB3 | Indicates the fast MCG recovery via SRB3 isenabled. | YES | Ignore |
| Energy saving indication | Indicates if the configuration is performed for energy saving reasons | YES | ignore |

Second Example of Implementation

A further example of implementation is provided to illustrate impact on NR RRC signaling (3GPP TS 38.331), in relation to the UE energy saving preferences for MR-DC operation. The current version of TS 38.331, v16.4.1, is provided below, with modifications relevant to this disclosure marked in bold underline.

1.1.1.1—RRCSetupComplete

The RRCSetupComplete message is used to confirm the successful completion of an RRC connection establishment.

Signalling radio bearer: SRB1
RLC-SAP: AM
Logical channel: DCCH
Direction: UE to Network RRCSetupComplete message

```
-- ASN1START
-- TAG-RRCSETUPCOMPLETE-START
RRCSetupComplete ::=    SEQUENCE {
    rrc-TransactionIdentifier    RRC-TransactionIdentifier,
    criticalExtensions    CHOICE {
        rrcSetupComplete    RRCSetupComplete-IEs,
        criticalExtensionsFuture    SEQUENCE { }
    }
}
RRCSetupComplete-IEs ::=    SEQUENCE {
    selectedPLMN-Identity INTEGER (1..maxPLMN),
    registeredAMF    RegisteredAMF    OPTIONAL,
    guami-Type    ENUMERATED {native, mapped}    OPTIONAL,
    s-NSSAI-List    SEQUENCE (SIZE (1..maxNrofS-NSSAI)) OF S-NSSAI OPTIONAL,
```

-continued

| RRCSetupComplete message |
| --- |

```
dedicatedNAS-Message DedicatedNAS-Message,
ng-5G-S-TMSI-Value CHOICE {
    ng-5G-S-TMSI    NG-5G-S-TMSI,
    ng-5G-S-TMSI-Part2 BIT STRING (SIZE (9))
}                                                   OPTIONAL,
lateNonCriticalExtension OCTET STRING           OPTIONAL,
nonCriticalExtension RRCSetupComplete-v1610-IEs      OPTIONAL
}
RRCSetupComplete-v1610-IEs ::= SEQUENCE {
    iab-NodeIndication-r16 ENUMERATED {true}        OPTIONAL,
    idleMeasAvailable-r16 ENUMERATED {true}         OPTIONAL,
    ue-MeasurementsAvailable-r16 UE-MeasurementsAvailable-r16   OPTIONAL,
    mobilityHistoryAvail-r16 ENUMERATED {true}      OPTIONAL,
    mobilityState-r16   ENUMERATED {normal, medium, high, spare}   OPTIONAL,
    nonCriticalExtension RRCSetupComplete-v1700-IEs      OPTIONAL
}
RegisteredAMF ::= SEQUENCE {
    plmn-Identity   PLMN-Identity   OPTIONAL,
    amf-Identifier   AMF-Identifier
}
RRCSetupComplete-v1700-IEs ::= SEQUENCE {
        energySavings-mrdc      EnergySavings-MRDC       OPTIONAL,
        ...
}
EnergySavings-MRDC ::= SEQUENCE {
    energySavings-mrdc-Type-r17 ENUMERATED {EN-DC, NR-DC,...}
    OPTIONAL,
    energySavings-mrdc-FR-r17 ENUMERATED {FR1-FR1, FR1-FR2,...}
    OPTIONAL,
}
-- TAG-RRCSETUPCOMPLETE-STOP
-- ASN1STOP
```

FIG. 11 is a flowchart illustrating a process 1100, according to an embodiment, performed by one or more network nodes for determining a radio configuration for a user equipment (UE) in multi-radio dual connectivity (MR-DC) operation. Process 1100 may begin in step s1102.

Step s1102 comprises obtaining information relating to energy for one or both of (i) the UE in MR-DC operation and (ii) one or more nodes involved in the MR-DC operation of the UE.

Step s1104 comprises determining an optimal radio configuration for the UE in MR-DC operation based at least in part on the information relating to energy.

Step s1106 comprises determining a final radio configuration for the UE in MR-DC operation based on the optimal radio configuration.

In some embodiments, information relating to energy comprises information related to one or more of: energy, power, energy efficiency, energy savings, power efficiency, power savings, energy consumption, power consumption, and a variation of any of these. In some embodiments, the method further includes a network node receiving a respective radio configuration from one or more nodes involved in the MR-DC operation of the UE, wherein determining a final radio configuration for the UE in MR-DC operation is further based at least in part on the respective radio configurations from the one or more nodes involved in the MR-DC operation of the UE. In some embodiments, determining a final radio configuration for the UE in MR-DC operation comprises evaluating each of the optimal radio configuration and respective radio configurations from the one or more nodes involved in the MR-DC operation of the UE and selecting the final radio configuration based on the evaluation.

In some embodiments, the final radio configuration is selected from one of the determined optimal radio configuration and the respective radio configurations from the one or more nodes involved in the MR-DC operation of the UE. In some embodiments, the final radio configuration comprises parts of more than one of the determined optimal radio configuration and the respective radio configurations from the one or more nodes involved in the MR-DC operation of the UE. In some embodiments, the method further includes configuring the UE in MR-DC operation with the final radio configuration. In some embodiments, the method is executed by at least one of the nodes involved in the MR-DC operation of the UE. In some embodiments, the method is executed in connection with a reconfiguration of the UE from single connectivity to Multi-Radio Dual Connectivity. In some embodiments, the method is executed in connection with a reconfiguration of the UE from Multi-Radio Dual Connectivity to single connectivity. In some embodiments, the method is executed in connection with a reconfiguration of the UE from a first form of Multi-Radio Dual Connectivity to a second form of Multi-Radio Dual Connectivity.

For example, a "form of dual connectivity" may include a connectivity where a multiple Rx/Tx capable UE may be configured to utilize resources provided by two different nodes connected via non-ideal backhaul, one providing NR access and the other one providing either E-UTRA or NR access, such as specified in 37.340 v16.5.0, clause 4.1.1. And "single connectivity" may include a form of connectivity where the UE is configured to utilize resources provided by one node, either providing NR access or providing E-UTRA access. Multi-Radio Dual Connectivity (MR-DC) is a generalization of the Intra-E-UTRA Dual Connectivity (DC) described in TS 36.300, where a multiple Rx/Tx capable UE may be configured to utilize resources provided by two different nodes connected via non-ideal backhaul, one providing NR access and the other one providing either E-UTRA or NR access, such as specified in 37.340 v16.5.0, clause 4.1.1.

In some embodiments, information relating to energy for one or both of (i) the UE in MR-DC operation and (ii) one or more nodes involved in the MR-DC operation of the UE comprises one or more of: information reported by the UE associated with a radio configuration; information related to UE associated Energy State Assistance Information (UE-ESAI); and information derived at a network node indicating energy consumption and/or energy savings and/or power consumption and/or power savings or indicating a variation in energy consumption and/or energy savings and/or power consumption and/or power savings. In some embodiments, information related to UE-ESAI comprises one or more of: a time stamp or time interval associated to the time of creation of the UE-ESAI and/or the time of storing the UE-ESAI; UE specific information related to energy; and indications pertaining to operational conditions and/or configurations under which UE-ESAI is stored. In some embodiments, obtaining information relating to energy for one or both of (i) the UE in MR-DC operation and (ii) one or more nodes involved in the MR-DC operation of the UE comprises one or more of: receiving the information from a source node where the information has been collected and requesting the information from the UE and/or the one or more nodes involved in the MR-DC operation of the UE.

In some embodiments, determining an optimal radio configuration for the UE in MR-DC operation is further based on one or more of: UE capabilities related to one or more of supported bandwidths, band combinations, feature sets, carrier aggregation parameters, MIMO parameters per band, MR-DC parameters, and modulations in UL and DL; fulfillment of QoS requirements for the UE; end-user preferences impacting energy savings; MR-DC procedures; and properties of at least one of the nodes involved in the MR-DC operation of the UE. In some embodiments, the properties of at least one of the nodes involved in the MR-DC operation of the UE include one or more of: whether the at least one of the nodes is a Master Node or a Secondary Node; node capabilities related to one or more of supported bandwidths, band combinations, feature sets, carrier aggregation parameters, MIMO parameters per band, MR-DC parameters, UL modulations, DL modulations; node QoS parameters setting and/or QoS fulfillment; node performance indicators and/or thresholds for node performance indicators; and configuration parameters that can impact network resources dedicated to one or more UEs.

In some embodiments, determining an optimal radio configuration for the UE in MR-DC operation based at least in part on the information relating to energy comprises using an artificial intelligence (AI) or machine-learning (ML) based model, the method further comprising creating or updating the AI or ML based model or algorithm based on the obtained information.

Figure 12:
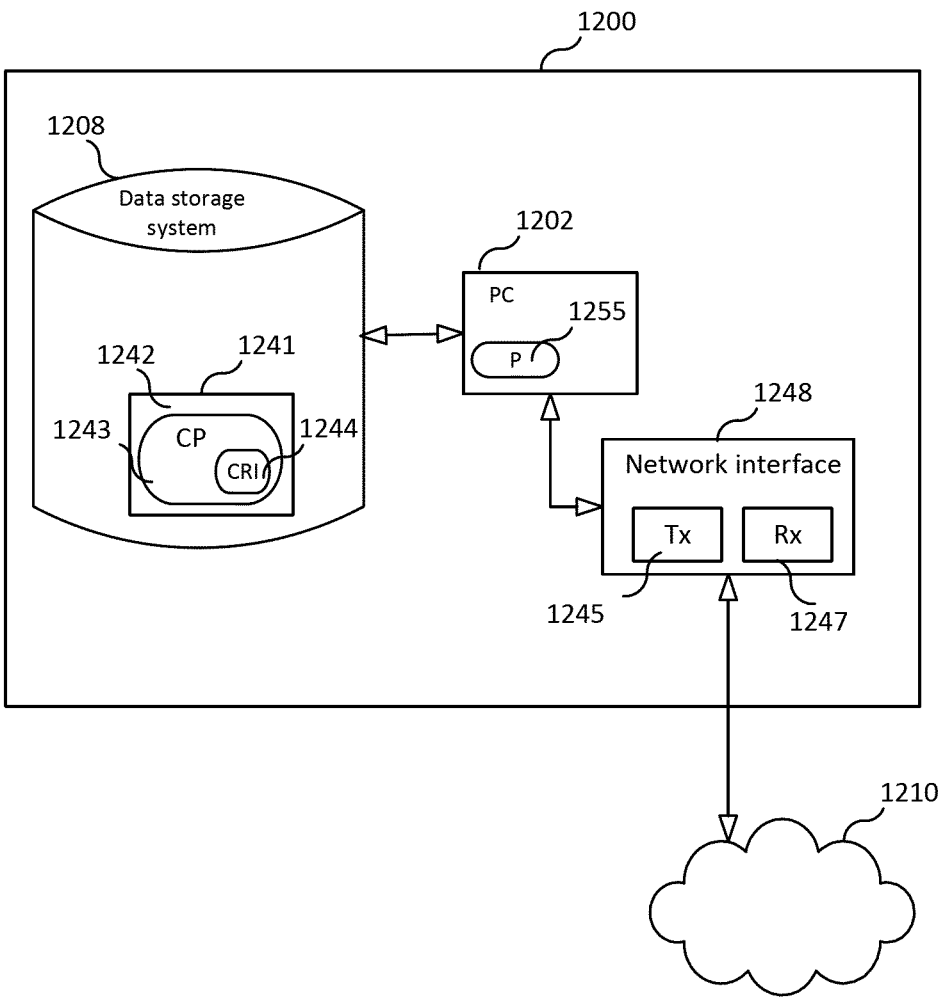
FIG. 12 is a block diagram of an apparatus according to some embodiments.

FIG. 12 is a block diagram of apparatus 1200 (e.g., a network node, such as a RAN node, a CN node, an OAM node, an SMO node), according to some embodiments, for performing the methods disclosed herein. As shown in FIG. 12, apparatus 1200 may comprise: processing circuitry (PC) 1202, which may include one or more processors (P) 1255 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 1200 may be a distributed computing apparatus); at least one network interface 1248 comprising a transmitter (Tx) 1245 and a receiver (Rx) 1247 for enabling apparatus 1200 to transmit data to and receive data from other nodes connected to a network 1210 (e.g., an Internet Protocol (IP) network) to which network interface 1248 is connected (directly or indirectly) (e.g., network interface 1248 may be wirelessly connected to the network 1210, in which case network interface 1248 is connected to an antenna arrangement); and a storage unit (a.k.a., "data storage system") 1208, which may include one or more non-volatile storage devices and/or one or more volatile storage devices. In embodiments where PC 1202 includes a programmable processor, a computer program product (CPP) 1241 may be provided. PC 1241 includes a computer readable medium (CRM) 1242 storing a computer program (CP) 1243 comprising computer readable instructions (CRI) 1244. CRM 1242 may be a non-transitory computer readable medium, such as, magnetic media (e.g., a hard disk), optical media, memory devices (e.g., random access memory, flash memory), and the like. In some embodiments, the CRI 1244 of computer program 1243 is configured such that when executed by PC 1502, the CRI causes apparatus 1200 to perform steps described herein (e.g., steps described herein with reference to the flow charts). In other embodiments, apparatus 1200 may be configured to perform steps described herein without the need for code. That is, for example, PC 1202 may consist merely of one or more ASICs. Hence, the features of the embodiments described herein may be implemented in hardware and/or software.

Summary of Various Embodiments

A1. A method for determining a radio configuration for a user equipment (UE) (802) in multi-radio dual connectivity (MR-DC) operation, the method comprising:

obtaining information relating to energy for one or both of (i) the UE (802) in MR-DC operation and (ii) one or more nodes (804, 806, 902, 1002) involved in the MR-DC operation of the UE (802);

determining an optimal radio configuration for the UE (802) in MR-DC operation based at least in part on the information relating to energy; and determining a final radio configuration for the UE (802) in MR-DC operation based on the optimal radio configuration.

A1a. The embodiment of A1, wherein information relating to energy comprises information related to one or more of: energy, power, energy efficiency, energy savings, power efficiency, power savings, energy consumption, power consumption, and a variation of any of these.

A2. The embodiment of any one of A1 and A1a, further comprising: receiving a respective radio configuration from one or more nodes (804, 806, 902, 1002) involved in the MR-DC operation of the UE (802), wherein determining a final radio configuration for the UE (802) in MR-DC operation is further based at least in part on the respective radio configurations from the one or more nodes (804, 806, 902, 1002) involved in the MR-DC operation of the UE (802).

A2a. The embodiment of A2, wherein determining a final radio configuration for the UE (802) in MR-DC operation comprises evaluating each of the optimal radio configuration and respective radio configurations from the one or more nodes (804, 806, 902, 1002) involved in the MR-DC operation of the UE (802) and selecting the final radio configuration based on the evaluation.

A2b. The embodiment of A2a, wherein the final radio configuration is selected from one of the determined optimal radio configuration and the respective radio configurations from the one or more nodes (804, 806, 902, 1002) involved in the MR-DC operation of the UE (802).

A2c. The embodiment of A2a, wherein the final radio configuration comprises parts of more than one of the determined optimal radio configuration and the respective radio configurations from the one or more nodes (804, 806, 902, 1002) involved in the MR-DC operation of the UE (802).

A3. The embodiment of any one of A1-A2 and A2a-A2c, further comprising configuring the UE (802) in MR-DC operation with the final radio configuration.

A4. The method of any one of embodiments A1-A3, wherein the method is executed by at least one of the nodes (804, 806, 902, 1002) involved in the MR-DC operation of the UE (802).

A5. The method of any one of embodiments A1-A4, wherein the method is executed in connection with a reconfiguration of the UE (802) from single connectivity to Multi-Radio Dual Connectivity.

A6. The method of any one of embodiments A1-A4, wherein the method is executed in connection with a reconfiguration of the UE (802) from Multi-Radio Dual Connectivity to single connectivity.

A7. The method of any one of embodiments A1-A4, wherein the method is executed in connection with a reconfiguration of the UE (802) from a first form of Multi-Radio Dual Connectivity to a second form of Multi-Radio Dual Connectivity.

A8. The method of any one of embodiments A1-A7, wherein information relating to energy for one or both of (i) the UE (802) in MR-DC operation and (ii) one or more nodes (804, 806, 902, 1002) involved in the MR-DC operation of the UE (802) comprises one or more of:

information reported by the UE (802) associated with a radio configuration;

information related to UE associated Energy State Assistance Information (UE-ESAI); and information derived at a network node indicating energy consumption and/or energy savings and/or power consumption and/or power savings or indicating a variation in energy consumption and/or energy savings and/or power consumption and/or power savings.

A9. The method of embodiment A8, wherein information related to UE-ESAI comprises one or more of:

a time stamp or time interval associated to the time of creation of the UE-ESAI and/or the time of storing the UE-ESAI;

UE (802) specific information related to energy; and indications pertaining to operational conditions and/or configurations under which UE-ESAI is stored.

A10. The method of any one of embodiments A1-A9, wherein obtaining information relating to energy for one or both of (i) the UE (802) in MR-DC operation and (ii) one or more nodes (804, 806, 902, 1002) involved in the MR-DC operation of the UE (802) comprises one or more of:

receiving the information from a source node where the information has been collected and requesting the information from the UE (802) and/or the one or more nodes (804, 806, 902, 1002) involved in the MR-DC operation of the UE (802).

A11. The method of any one of A1-A10, wherein determining an optimal radio configuration for the UE (802) in MR-DC operation is further based on one or more of:

UE (802) capabilities related to one or more of supported bandwidths, band combinations, feature sets, carrier aggregation parameters, MIMO parameters per band, MR-DC parameters, and modulations in UL and DL;

fulfillment of QoS requirements for the UE (802);

end-user preferences impacting energy savings;

MR-DC procedures; and properties of at least one of the nodes (804, 806, 902, 1002) involved in the MR-DC operation of the UE (802).

A12. The method of embodiment A11, wherein the properties of at least one of the nodes (804, 806, 902, 1002) involved in the MR-DC operation of the UE (802) include one or more of:

whether the at least one of the nodes (804, 806, 902, 1002) is a Master Node or a Secondary Node;

node capabilities related to one or more of supported bandwidths, band combinations, feature sets, carrier aggregation parameters, MIMO parameters per band, MR-DC parameters, UL modulations, DL modulations;

node QoS parameters setting and/or QoS fulfillment;

node performance indicators and/or thresholds for node performance indicators; and configuration parameters that can impact network resources dedicated to one or more UEs (802).

A13. The method of any one of embodiments A1-A12, wherein determining an optimal radio configuration for the UE (802) in MR-DC operation based at least in part on the information relating to energy comprises using an artificial intelligence (AI) or machine-learning (ML) based model, the method further comprising creating or updating the AI or ML based model or algorithm based on the obtained information.

B1. A computer program (1243) comprising instructions which when executed by processing circuitry (1202) of a node (804, 806, 902, 1002, 1200), causes the node (804, 806, 902, 1002, 1200) to perform the method of any one of embodiments A1-A13.

B2. A carrier containing the computer program (1243) of embodiment B1, wherein the carrier is one of an electronic signal, an optical signal, a radio signal, and a computer readable storage medium (1242).

C1. A network node (804, 806, 902, 1002, 1200), the network node comprising:

processing circuitry (1242); and a memory, the memory containing instructions (1244) executable by the processing circuitry (1242), whereby the network node (804, 806, 902, 1002, 1200) is configured to perform the method of any one of embodiments A1-A13.

D1. A network node (804, 806, 902, 1002, 1200) configured to determine a radio configuration for a user equipment (UE) (802) in multi-radio dual connectivity (MR-DC) operation, the network node (804, 806, 902, 1002, 1200) being further configured to:

obtain information relating to energy for one or both of (i) the UE (802) in MR-DC operation and (ii) one or more nodes (804, 806, 902, 1002) involved in the MR-DC operation of the UE (802);

determine an optimal radio configuration for the UE (802) in MR-DC operation based at least in part on the information relating to energy; and determine a final radio configuration for the UE (802) in MR-DC operation based on the optimal radio configuration.

D2. The network node (804, 806, 902, 1002, 1200) of embodiment D1, wherein the network node (804, 806, 902, 1002, 1200) is further configured to perform the method of any one of embodiments A2-A13.

While various embodiments are described herein, it should be understood that they have been presented by way of example only, and not limitation. Thus, the breadth and scope of this disclosure should not be limited by any of the above described exemplary embodiments. Moreover, any combination of the above-described embodiments in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by one or more network nodes for determining a radio configuration for a user equipment (UE) in multi-radio dual connectivity (MR-DC) operation, the method comprising:

obtaining information relating to energy for one or both of (i) the UE in MR-DC operation and (ii) one or more network nodes involved in the MR-DC operation of the UE;

determining an optimal radio configuration for the UE in MR-DC operation based at least in part on the information relating to energy; and determining a final radio configuration for the UE in MR-DC operation based on the optimal radio configuration.

2. The method according to claim 1, wherein information relating to energy comprises information related to one or more of: energy, power, energy efficiency, energy savings, power efficiency, power savings, energy consumption, power consumption, and a variation of any of these.

3. The method according to claim 1, further comprising: a network node receiving a respective radio configuration from one or more network nodes involved in the MR-DC operation of the UE, wherein determining a final radio configuration for the UE in MR-DC operation is further based at least in part on the respective radio configurations from the one or more network nodes involved in the MR-DC operation of the UE.

4. The method according to claim 3, wherein determining a final radio configuration for the UE in MR-DC operation comprises evaluating each of the optimal radio configuration and respective radio configurations from the one or more network nodes involved in the MR-DC operation of the UE and selecting the final radio configuration based on the evaluation.

5. The method according to claim 4, wherein the final radio configuration is selected from one of the determined optimal radio configuration and the respective radio configurations from the one or more network nodes involved in the MR-DC operation of the UE.

6. The method according to claim 4, wherein the final radio configuration comprises parts of more than one of the determined optimal radio configuration and the respective radio configurations from the one or more network nodes involved in the MR-DC operation of the UE.

7. The method according to claim 1, further comprising configuring the UE in MR-DC operation with the final radio configuration.

8. The method according to claim 1, wherein the method is executed by at least one of the network nodes involved in the MR-DC operation of the UE.

9. The method of claim 1, wherein the method is executed in connection with a reconfiguration of the UE from single connectivity to Multi-Radio Dual Connectivity.

10. The method according to claim 1, wherein the method is executed in connection with a reconfiguration of the UE from Multi-Radio Dual Connectivity to single connectivity.

11. The method according to claim 1, wherein the method is executed in connection with a reconfiguration of the UE from a first form of Multi-Radio Dual Connectivity to a second form of Multi-Radio Dual Connectivity.

12. The method according to claim 1, wherein information relating to energy for one or both of (i) the UE in MR-DC operation and (ii) one or more network nodes involved in the MR-DC operation of the UE comprises one or more of:

information reported by the UE associated with a radio configuration;

information related to UE associated Energy State Assistance Information (UE-ESAI); and information derived at a network node indicating energy consumption and/or energy savings and/or power consumption and/or power savings or indicating a variation in energy consumption and/or energy savings and/or power consumption and/or power savings.

13. The method according to claim 12, wherein information related to UE-ESAI comprises one or more of:

a time stamp or time interval associated to the time of creation of the UE-ESAI and/or the time of storing the UE-ESAI;

UE specific information related to energy; and indications pertaining to operational conditions and/or configurations under which UE-ESAI is stored.

14. The method according to claim 1, wherein obtaining information relating to energy for one or both of (i) the UE in MR-DC operation and (ii) one or more network nodes involved in the MR-DC operation of the UE comprises one or more of:

receiving the information from a source node where the information has been collected and requesting the information from the UE and/or the one or more network nodes involved in the MR-DC operation of the UE.

15. The method according to claim 1, wherein determining an optimal radio configuration for the UE in MR-DC operation is further based on one or more of:

UE capabilities related to one or more of supported bandwidths, band combinations, feature sets, carrier aggregation parameters, MIMO parameters per band, MR-DC parameters, and modulations in UL and DL;

fulfillment of QoS requirements for the UE;

end-user preferences impacting energy savings;

MR-DC procedures; and properties of at least one of the network nodes involved in the MR-DC operation of the UE.

16. The method according to claim 15, wherein the properties of at least one of the network nodes involved in the MR-DC operation of the UE include one or more of:

whether the at least one of the network nodes is a Master Node or a Secondary Node;

node capabilities related to one or more of supported bandwidths, band combinations, feature sets, carrier aggregation parameters, MIMO parameters per band, MR-DC parameters, UL modulations, DL modulations;

node QoS parameters setting and/or QoS fulfillment;

node performance indicators and/or thresholds for node performance indicators; and configuration parameters that can impact network resources dedicated to one or more UEs.

17. The method according to claim 1, wherein determining an optimal radio configuration for the UE in MR-DC operation based at least in part on the information relating to energy comprises using an artificial intelligence (AI) or machine-learning (ML) based model, the method further comprising creating or updating the AI or ML based model or algorithm based on the obtained information.

18. The method of claim 1, wherein the information relating to energy relates to energy for one or more network nodes involved in the MR-DC operation of the UE.

19. A network node, the network node comprising:

processing circuitry; and a memory, the memory containing instructions executable by the processing circuitry, whereby the network node is configured to:

obtain information relating to energy for one or both of (i) the UE in MR-DC operation and (ii) one or more network nodes involved in the MR-DC operation of the UE;

determine an optimal radio configuration for the UE in MR-DC operation based at least in part on the information relating to energy; and determine a final radio configuration for the UE in MR-DC operation based on the optimal radio configuration.

20. The network node of claim 19, wherein information relating to energy comprises information related to one or more of: energy, power, energy efficiency, energy savings, power efficiency, power savings, energy consumption, power consumption, and a variation of any of these.

21. The network node of claim 19, wherein the network node is further configured to receive a respective radio configuration from one or more network nodes involved in the MR-DC operation of the UE, wherein determining a final radio configuration for the UE in MR-DC operation is further based at least in part on the respective radio configurations from the one or more network nodes involved in the MR-DC operation of the UE.

* * * * *